(12) United States Patent
Frigon

(10) Patent No.: US 7,173,992 B2
(45) Date of Patent: Feb. 6, 2007

(54) METHOD FOR SYNCHRONIZATION IN WIRELESS SYSTEMS USING RECEIVE DIVERSITY

(75) Inventor: Jean-Francois Frigon, Los Angeles, CA (US)

(73) Assignee: Sasken Communication Technologies Limited (IN)

( * ) Notice: Subject to any disclaimer, the term of this patent is extended or adjusted under 35 U.S.C. 154(b) by 432 days.

(21) Appl. No.: 10/021,220

(22) Filed: Dec. 11, 2001

(65) Prior Publication Data

US 2003/0108135 A1  Jun. 12, 2003

(51) Int. Cl.
 *H04L 7/00* (2006.01)
(52) U.S. Cl. ...................... 375/354; 375/149
(58) Field of Classification Search ................ 375/354, 375/267, 149
See application file for complete search history.

(56) References Cited

U.S. PATENT DOCUMENTS

| | | | |
|---|---|---|---|
| 5,031,193 A | 7/1991 | Atkinson et al. | |
| 5,321,850 A | 6/1994 | Backstrom et al. | 455/139 |
| 5,790,588 A * | 8/1998 | Fukawa et al. | 375/148 |
| 6,347,234 B1 * | 2/2002 | Scherzer | 455/562.1 |
| 6,356,605 B1 * | 3/2002 | Hosur et al. | 375/347 |
| 2003/0026348 A1 * | 2/2003 | Llang et al. | 375/267 |
| 2003/0076875 A1 * | 4/2003 | Oates | 375/147 |

FOREIGN PATENT DOCUMENTS

EP  1 128 568  8/2001

OTHER PUBLICATIONS

Fechtel, et al. 1993, Combined equalization decoding and antenna diversity combining for mobile/personal digital radio transmission using feedforward synchronization, IEEE, pp. 633-636.*

Ramjee Prasad, "An Overview of CDMA Evolution toward Wideband CDMA", 1998, IEEE, pp. 1-29.*

Min Kyu Park et al., "Performance of Serial Acquisition Schemes Using Antenna Arrays in the DS-SS System", Doc ID: XP-000894301, Nov. 8, 1998, pp. 195-200.

Roland R. Rick et al., "Parallel Acquistion of Spread-Spectrum Signals with Antenna Diversity", Ations vol. 45, No. 8, Aug. 1997, pp. 903-905 Doc. ID:XP-000702905.

Chae-Hyun Lim et al., "Adaptive Hybrid Acquisition with Antenna Diversity in CDMA Systems", Doc ID: XP-010579201, Oct. 28, 2001, pp. 1243-1247.

Min Kyu Park et al., "Performance of Serial Acquisition Schemes Using Antenna Arrays in the DS-SS System", Doc ID: XP-000894301, Nov. 8, 1998, pp. 195-200.

Roland R. Rick et al., "Parallel Acquisition of Spread-Spectrum Signals with Antenna Diversity", Ations vol. 45, No. 8, Aug. 1997, pp. 903-905 Doc. ID: XP-000702905.

Chae-Hyun Lim et al., "Adaptive Hybrid Acquisition with Antenna Diversity in CDMA Systems", Doc ID: XP-010579201, Oct. 28, 2001, pp. 1243-1247.

Elisabeth A. Neasmith and Norman C. Beaulieu, "New Results on Selection Diversity"-manuscript was received at IEEE on Nov. 15, 1996; revised Apr. 15, 1997, Oct. 15, 1997, and Feb. 15, 1998. This paper was presented in part at WIRELESS' 96, Calgary, Alta., Canada Jul. 9, 1006. Publisher -—IEEE Transactions on Communications, vol. 46, No. 5, May 1998. (Page Nos. 695-704).

* cited by examiner

*Primary Examiner*—Temesghen Ghebretinsae
*Assistant Examiner*—Juan Alberto Torres
(74) *Attorney, Agent, or Firm*—Welsh & Katz, Ltd.

(57) ABSTRACT

A preferred embodiment of the invention is a method for synchronizing a mobile terminal comprising M diversity branches to a wireless network using diversity combination to acquire the code transmitted from a base-station and to determine the frequency offset of the transmitted code.

24 Claims, 20 Drawing Sheets

METHOD FOR SYNCHRONIZATION IN WIRELESS SYSTEMS USING RECEIVE DIVERSITY

FIELD OF THE INVENTION

The invention generally relates to the field of wireless signal processing, and more specifically relates to improved synchronization between a mobile terminal and wireless network.

BACKGROUND OF THE INVENTION

In order for a mobile terminal, such as cellular handset, to establish a connection with a wireless network, the mobile terminal typically needs to synchronize itself to the wireless network. In a code division multiple access (CDMA) or wideband-CDMA (WCDMA) network, handset-network synchronization generally consists of two steps. The first is referred to as code-synchronization, while the second is referred to as frequency synchronization.

In CDMA systems, all base stations utilize the same frequency band, however, they are uniquely identified by the particular pseudo-random (PN) code that they use. Upon power-up the mobile terminal typically attempts to identify the nearest base station by searching for and identifying the strongest PN code. This process is typically referred to as code-synchronization. Next, the mobile terminal typically initiates a frequency synchronization process in which it tries to exactly match its oscillator frequency with that of the identified base-station. However, although two oscillators may be set in the factory to oscillate at the same frequency, perfect matching is almost never achieved without the use of a feedback network.

Code Synchronization

The base station in a CDMA network broadcasts a PN code. A PN code may be characterized as sequence of N+1's and −1's. The code is different for each base station. Assume that the code number b transmitted from the $b^{th}$ base station is an N symbols long code $c_{b,n}, n=0, \ldots, N-1$. Next assume that these symbols when received by the mobile terminal may be denoted as $r_t = c_{b,(t \bmod N)} + n_t + I_t$, where the index t represents the time index, $c_{b,(t \bmod N)}$ represents the code number b transmitted at time t, $n_t$ represents the noise component at time t, and $I_t$ represents interference from other base stations. Using the received samples, the mobile terminal must simultaneously search for all the different codes that may be sent from different base stations and identify the first element of the code. This is most commonly achieved using a matched filter or a correlator.

The output $y_t$, of a matched filter at time t, querying the b'th base station may be represented by:

$$y_t = \sum_{n=0}^{N-1} r_{t-n} C^*_{b,N-1-n} \qquad \text{Equation 1}$$

N is usually predetermined based upon prior knowledge of the length of the synchronization codes. $r_{t-n}$ is the complex sample received by the mobile terminal at time (t−n). $c^*_{b,N-1-n}$ is the complex code transmitted by the base station at time (N−1−n). The operator 'c*' denotes the conjugate of 'c'. In general, $c^*_{b,N-1-n}$ is known in advance and is unique to each base station. Note that when the time index t is equal to aN−1, where a is a positive integer number, then we have $r_{t-n} = c_{b,N-1-n} + n_{t-n} + I_{t-n}$. Ignoring the noise and the interference terms results in a maximum for $y_t$ given by $$y_{\max} = \sum_{n=0}^{N-1} |c_{b,n}|^2.$$

A typical method illustrated in FIG. 1 for code synchronization compares 7 the output $|y_t|$ of a matched filter 1 or of a correlator to a predetermined threshold 3. Code synchronization 5 is said to be achieved when the matched filter 1 output magnitude 1 exceeds a pre-determined threshold 3. If the matched filter output magnitude does not exceed a pre-determined threshold 3, the system continues searching 10. Exceeding this threshold usually coincides with the maximum output from the matched filter and indicates the presence of the code at the given time offset (i.e., the code starts at t−N+1). The threshold may be selected to achieve a desired probability of false alarm (i.e., the probability of detecting the code at a wrong offset).

In a low signal to noise ratio environment, the matched filter output rarely reaches the threshold level. Therefore, in a second typical approach illustrated in FIG. 2, the matched filter output magnitude 1 is stored in memory for a set of possible candidates 11. The set of possible candidates 11 consists of different code time offset (i.e., start time of the code) and different code numbers. For each possible candidate 11, the matched filter output magnitude 1 is stored in a memory and averaged over multiple observations. At the end of the averaging period, the stored value with the largest value is selected 13, and if the value exceeds 19, a pre-determined threshold 15, the code acquisition is said to be achieved 17. Otherwise the system continues searching 21. Note that in some cases, the threshold might be set to zero. The detected code number and time offset are the candidate associated with the selected stored value. This approach is referred to as maximum selection code acquisition.

Other variants for code acquisition use multi-dwell and multi stage strategies. See e.g. A. J. Eynon, and T. C. Toer, A Comparison of Multiple Dwell Cell Testing Strategies in Serial Search Direct Sequence Spread Spectrum Code Acquisition, Proc. of Milcom '95, Vol 1, Sand Diego, Calif. pp. 357–361; H. Holma and A Toskala, WCDMA for UTMS, John Wiley and Sons, 2000. These references and all other references herein are hereby incorporated by reference. In a multi-dwell code acquisition approach, the search is done in multiple steps. Generally, each step uses an increasing threshold level and the matched filter output is averaged over a longer period of time before comparison to the threshold. If the averaged value does not exceed the threshold at a given step, the code acquisition algorithm restarts with a different candidate, otherwise it proceeds to the next step until the last step. When the averaged value for the last step exceeds the pre-determined threshold, the code acquisition is said to be achieved.

An example of a multi-stage code acquisition is the cell search procedure employed in Wideband-CDMA. H. Holma and A Toskala, *WCDMA for UTMS*, John Wiley and Sons, 2000. In W-CDMA, code acquisition is divided in three stages. Slot boundary candidates are identified in the first stage using the Primary Code Synchronization. Based on the one or more slot boundary candidates identified in the first stage, the second stage identifies frame boundary and code group candidates based on the Secondary Code Synchronization. Finally, the third stage identifies, based on the information provided by the second stage, the Gold code transmitted by a base station using the pilot channel. Once a Gold code is successfully detected in the last stage, code acquisition is said to be achieved.

A typical matched filter logic is shown in FIG. 3. Using notation common in the art, $z^{-1}$ represents a delay element 25 in a matched filter. A delay element 25 is a memory. Typically there are N−1 delay elements 25. Each delay element contains a sample, $r_{j-1}$ 23, received at a previous time instant. In order to better illustrate FIG. 3 and Equation 1, assume that N=10 and t=100. Accordingly, in a first step, when n=0 in Equation 1, $r_{b,100}$ is multiplied 27 by $c^*_{b,9}$(N−1−n=10−1−0=9) 29. In a second step, when n=1 in Equation 1, $r_{b,99}$ is multiplied 27 by $c^*_{b,8}$(N−1−n=10−1−1=8). In a third step, the products of steps 1 and 2 are summed 33. These steps are then repeated until n=N−1=9.

One problem with the use of matched filters for code detection is that they generally require a large amount of computation. This is particularly limiting when the code length is large. In this case, an alternative approach may employ a correlator code detector. FIG. 4 shows the functionality of the correlator in block diagram form. As in FIG. 3, $z^{-1}$ represents a delay element 25, however, unlike the matched filter, the correlator only utilizes one delay element 25 in an accumulator configuration 35. The incoming sequence $r_{b,t}$ 23 is first multiplied 27 with the sequence $c_{b,N-1+t-T}^*$, 37 where b is the code number, N is the code length, t is the time index, and T is the time where the correlator output is observed (sampled). The result of the multiplication is then accumulated 39. The accumulator 35 is reset at time t=T−N+1 41 and sampled at time t=T 43 to yield $y_t$ 45.

In order to better illustrate the operation of the correlator, assume that the first symbol of the PN code, $c_{b,0}$, arrives at the receiver at the $t^{th}$ time index (i.e, tmodN=0). In this case $r_t=c_{b,0}+n_t+I_t$, is presented to the multiplier in FIG. 4. Further assume that the memory element is reset to zero at the t'th time index (i.e., t=T−N+1). Therefore at time t, the receiver unit presents $c_{b,0}$ to the other input of the multiplier, followed by $c_{b,1}$ at the $(t+1)^{st}$ time sample, $c_{b,2}$ at the $(t+2)^{nd}$ time sample, etc. Then at time sample (t+N−1) at the output of the accumulator we will have $$y_{t+N-1} = y_T = \sum_{n=0}^{N-1} |c_{b,n}|^2,$$

ignoring the noise components. This exactly matches the maximum output of the matched filter. However, the correlator output differs from that of the matched filter in that the correlator output is only valid after an accumulation of N samples, whereas a matched filter output is valid every sample. The correlator has $1/N^{th}$ the complexity of the matched filter. A matched filter is equivalent to N correlators in parallel.

Undesirable Effects of Frequency Offset

The oscillator in a wireless network base-station and the local oscillator in a mobile terminal rarely oscillate at the same frequency. Because of this frequency offset between the basestation and the mobile terminal, the received signal $r_t$ at the $t^{th}$ time index (sample) may be represented as: $r_t=c_{b,tmodN}e^{j\Delta wtT_s}$ where $T_s$ represents the sampling interval (time between two consecutive samples), Δw represents the frequency offset, and $e^{jx}=\cos x + \sqrt{-1} \sin x$. A "frequency recovery loop" is typically used to drive the frequency difference to zero. Once Δw is driven to zero, so-called coherent detection can take place. In the absence of this (when Δw≠0), detection can still take place but it is less efficient and is referred to as non-coherent detection.

Code Synchronization in the Presence of Frequency Offset

One problem affecting the application of matched filters or correlators for acquiring the PN code transmitted from a base station is that as the frequency offset between the base station (network) and mobile terminal increases, the reliability of the code acquisition decreases. The frequency offset between the network and the mobile terminal may increase because of imperfections or variations in the network oscillator, the mobile terminal oscillator, or both. A frequency offset interferes with proper code detection by adding a phase rotation between two consecutive symbols. This is referred to throughout as coherence loss. If a sufficient phase is added between two symbols, then PN code synchronization via the matched filter or correlator becomes unreliable. To illustrate this, assume that the received signal, at time t=aN−1, where a is a positive integer number, may be represented by $r_t=c_{b,tmodN}e^{j\Delta wtT_s}$ (ignoring noise and interference terms). The matched filter output may then be represented by $$y_t = \sum_{n=0}^{N-1} |c_{b,n}|^2 e^{j\Delta w(t-n)T_s}. \text{Typically, } |c_{b,n}|^2$$

is constant for any b and t. If it is further assumed that $\Delta w=2\pi/(NT_s)$, then $y_t=0$ and code synchronization is impossible.

If the coherence loss produces an unacceptable performance, signal processing techniques must be employed to mitigate this effect. One approach is to correct the frequency of the incoming signal $r_t$ by multiplying it by $e^{-j\Delta wtT_s}$. However, since Δw is unknown at the receiver, Δw must be scanned through the range of possible values until the synchronization code is detected. R. L. Peterson, R. E. Ziemer and D. E. Borth, *Introduction to Spread Spectrum Communications*, Prentice Hall, 1995. This approach increases the search time by a factor F, where F is the number of frequencies scanned.

Another approach is to divide the matched filter or correlator into smaller blocks where the coherence loss is negligible (referred to throughout as "coherent filters") and then add their output non-coherently. Y. E. Wang and T. Ottosson, *Cell Search in W-CDMA*, IEEE JSAC, Vol. 18, No. 8, August 2000, pp 1470–1481. For example, if a matched filter is divided into S coherent sections of length D (SD=N), the output magnitude of the matched filter sampled at the $t^{th}$ symbol is then given by:

$$|y_t| = \sum_{s=0}^{S-1} \left| \sum_{d=0}^{D-1} r_{t-sD-d} c_{b,N-1-sD-d}^* \right| \quad \text{Equation 2}$$

N, again, represents the number of symbols transmitted in a synchronization code by the base-station b. The length of coherent sections is chosen such that $$\sum_{d=0}^{D-1} e^{j\Delta wdT_s} \approx D$$

which limits the loss due to frequency offset. This approach does not affect the search time, but decreases the processing gain of the detector by a factor S. If a channel estimate is available (in the case of multi-stage acquisition, partial detection can be achieved and be used to provide a reference), it can be used to produce a coherent output. For example, assume the channel estimate for the $s^{th}$ partial matched filter is given by $c^0{}_s$, then the output magnitude of the matched filter would be given by:

$$|y_t| = \sum_{s=0}^{S-1} \text{Real}\left( c_s^{0*} \sum_{d=0}^{D-1} r_{t-sD-d} c_{b,N-1-sD-d}^* \right) \qquad \text{Equation 3}$$

Frequency Synchronization

Once the code synchronization has been achieved, it is used to synchronize the mobile terminal's oscillator frequency with the network frequency of the identified base station through a procedure referred to as frequency synchronization. The code synchronization provides the code number b transmitted by the wireless network and the time index T corresponding to the first symbol of the transmitted code.

The first step to frequency synchronization consists of computing partial code correlations of the input sequence $r_t = c_{b,(t-T) mod N} e^{j\Delta wtT_s} + n_t$, where $T_s$ represents the sampling interval (time between two consequtive samples), $\Delta w$ represents the frequency offset to be determined and $\eta_1$ represents the noise component at time J. The partial code correlations are denoted by $y_k$, where k is a new time index after the partial correlators, and are computed over L consecutive received symbols $r_l$. The partial code correlations are given by:

$$y_k = \sum_{l=kL}^{(k+1)L-1} r_l c_{b,(l-T) mod N}^* \qquad \text{Equation 4}$$

One approach to frequency synchronization determines the frequency offset from K consecutive partial code correlations of length L, $y_k, \ldots, y_{k+K-1}$. The K correlator outputs $y_k, \ldots, y_{k+K-1}$ are augmented into a P-point vector by appending them with P-K zeros, a P-point Fourier Transform is then taken of the newly formed vector. A. V. Oppenheim and R. W. Schafer, *Discrete-Time Signal Processing*, Prentice Hall, 2d Ed. 1999. The Fourier Transform in turn delivers an output vector of size P given by:

$$X(p) = \sum_{l=k}^{k+K-1} y_l e^{-j2\pi p l/P} \qquad 0 \le p < P \qquad \text{Equation 5}$$

To obtain better reliability, the Fourier Transform output can be averaged over multiple outputs. The element of the averaged Fourier Transform output vector with the largest value yields the frequency offset estimate. In order to improve the accuracy, an interpolation can also be performed on the averaged Fourier Transform value. Y. E. Wang and T. Ottosson, *Cell Search in W-CDMA*, IEEE JSAC, Vol. 18, No. 8, August 2000, pp 1470–1481.

Another approach for frequency acquisition employs a differential detection scheme (DD). In this method, a frequency estimate is obtained by multiplying the partial correlation $y_{k+1}$ with the complex conjugate of the previous partial correlation $y_k$ (k is the time index after the correlator). Assuming $|c_k|^2=1$, we obtain $y_{k+1} y^*{}_k \approx \lambda e^{j\Delta wLT_s}$ (ignoring the noise term), where $\lambda$ is a proportionality constant. Since L, and $T_s$ are known constants, this provides a metric from which the frequency offset can be derived.

The frequency offset can be computed from the differential detector (DD) output metric in two ways. In the first approach, we can average the metric over several trials and then compute the frequency offset from the averaged value as follows:

$$f_{offset} = \frac{T_s}{2\pi L} L \sum_{i=k}^{k+K-1} y_{i+1} y_i^*. \qquad \text{Equation 6}$$

H. Meyr, M. Moeneclaey, and S. A. Fechtel, *Digital Communication Receivers—Synchronization, Channel Estimation and Signal Processing*, John Wiley & Sons, 1998.

The other approach is to use the DD output metric in a phase locked ioop (PLL) as illustrated in FIG. 5. Id. The DD output X(1) 53 is an indication of the sign and magnitude of the frequency offset. A non-linear device 54 might be employed to obtain only the direction of the rotation in order to simplify the implementation. The output of the non-linear device may be filtered by a low pass filter 55 to remove the noise and accumulated 57 to provide an estimate of the frequency offset. The frequency offset is used to control a Direct Digital Frequency Synthesizer (DDFS) 59. A DDFS 59 produces at its output a sinusoid with a frequency controlled by the input frequency offset value.

This sinusoid is used to derotate 61 the input signal $r_j$ 63. The derotated signal 65 is used as the input to the DD 51. It can be easily seen that at the beginning, when the frequency offset estimate is not accurate, the DD will detect a frequency offset at its output. This non-zero output then increases/decreases the frequency offset estimate in the accumulator. When the frequency offset estimate is accurate, the DDFS perfectly compensate for the phase rotation due to the frequency output. Then the DD output is equal to zero and the PLL is stabilized (i.e., the accumulator stops increasing/decreasing the frequency offset estimate).

Diversity Methods

Diversity is a technique used in wireless communication systems to provide significant performance improvement and has been traditionally applied to improve the quality of data detection in wireless communication systems. T. S. Rappaport, *Wireless Communications-Principles and Practice*, Prentice Hall, 1996. Diversity exploits the random nature of radio propagation by processing independent copies of the transmitted signal. The different copies of the signal are received through what is typically called diversity branches. Different forms of diversity include: space (antenna) diversity; polarization diversity; frequency diversity; and time diversity. Diversity reception (combining) methods can be classified into the following categories: selection diversity; switched diversity; maximal ratio combining; and equal gain combining.

Antenna diversity is one of the most popular forms of diversity used in wireless systems. This form of diversity exploits the fact that signals received by spatially separated antennas (approximately half a wavelength at the mobile terminal) are essentially uncorrelated. Polarization diversity exploits the fact that signals received on the horizontal and vertical antenna polarization are essentially uncorrelated. Frequency diversity exploits the fact that in a wideband channel, signals received at a frequency separation greater than the coherence bandwidth of the channel are essentially uncorrelated. Time diversity exploits the fact that for a time varying channel, signals received at time spacing greater than the coherence time of the channel are essentially uncorrelated.

A selection diversity receiver employs M parallel diversity branches 67. A high level schematic/logic of a typical receiver using selection diversity is illustrated in FIG. 6. FIG. 6 illustrates a typical wireless receiver comprising M parallel diversity branches 67, each comprising an RF downconverter 69 and a data demodulator 71. Each diversity branch receives a time dependent signed $S_m$ (t) 73. In a selection diversity receiver the signal of the diversity branch 67 with the highest instantaneous signal to noise ratio (SNR) selected 75 and input to the slicer 77.

A conceptual variation on a selection diversity receiver is a switched diversity receiver. A switched diversity receiver employs M diversity branches and a single RF/demodulator chain, rather than the parallel RF/demodulator chains found in the selection diversity receiver. In such a receiver, the M diversity branches are scanned until the received SNR exceeds a preset threshold, and upon exceeding the threshold, the signal is output to the slicer. If the SNR falls below the threshold level, the scanning process continues.

A high level schematic/logic of a typical maximal ratio combining receiver is illustrated in FIG. 7. This receiver, like the selection diversity receiver, utilizes M parallel diversity branches 67 each comprising an RF downconverter 69 and a data demodulator 71. Each diversity branch receives a time dependent signal S(t) 73. The M diversity branches 67 output to a common slicer 77. However, instead of selecting the signal with the largest SNR as is the case with a selection diversity receiver, in a maximal ratio combining receiver, the signals 73 from all diversity branches 67 are co-phased 87 and weighted 89 according to their individual SNR ($G_i$ coefficients 91) before being summed.

In an equal gain combining receiver, instead of implementing a true maximal ratio combination, the branch weights are all set to unity, but the signals from each branch are co-phased to provide equal gain combining.

SUMMARY OF THE INVENTION

A preferred embodiment of the invention is a method for synchronizing a mobile terminal to a wireless network using diversity combination to acquire the code transmitted from a base-station and to determine the frequency offset of the transmitted code. The mobile terminal preferably comprises M diversity branches. Each diversity branch preferably comprises a down-converter section, a selector, a code matched filter or a code correlator, and a Fourier Transform (FT) or Differential Detection (DD) section.

In a preferred first step according to the methods of the invention, the output of each of the code matched filter or correlator is combined using a diversity antenna combination method. Preferred diversity combination methods for code synchronization include, selection diversity, coherent combination and non-coherent combination. In a preferred second step according to the methods of the invention, this combined output is analyzed to detect the presence of the code and achieve code synchronization. Then, in a preferred third step, the frequency offset of the code transmitted by the base-station is estimated from the signals received on the M diversity branches through a FT or DD section.

DETAILED DESCRIPTION OF THE INVENTION

Preferred Methods for Synchronization

A preferred embodiment of this invention involves a method for synchronizing a diversity mobile terminal to a wireless network.

A preferred method for synchronizing a diversity mobile terminal to a wireless network employs a diversity receiver with M parallel diversity branches for code synchronization and a diversity receiver with M parallel diversity branches for frequency synchronization. Each diversity branch comprises a down-converter, a selector, and the logic for code and frequency synchronization.

Assume that the received signal from the $m^{th}$ ($1 \leq m \leq M$) diversity branch is given by $s_m(t_c)$, where $t_c$ represents the continuous time. Theses signals are analog and represent the M different received copies of the transmitted signal received through the use of a diversity reception method. The signals $s_m(t_c)$ are converted to baseband digital signals $r_{m,t}$, where t is the discrete time index, in the down-converters.

Figure 1:
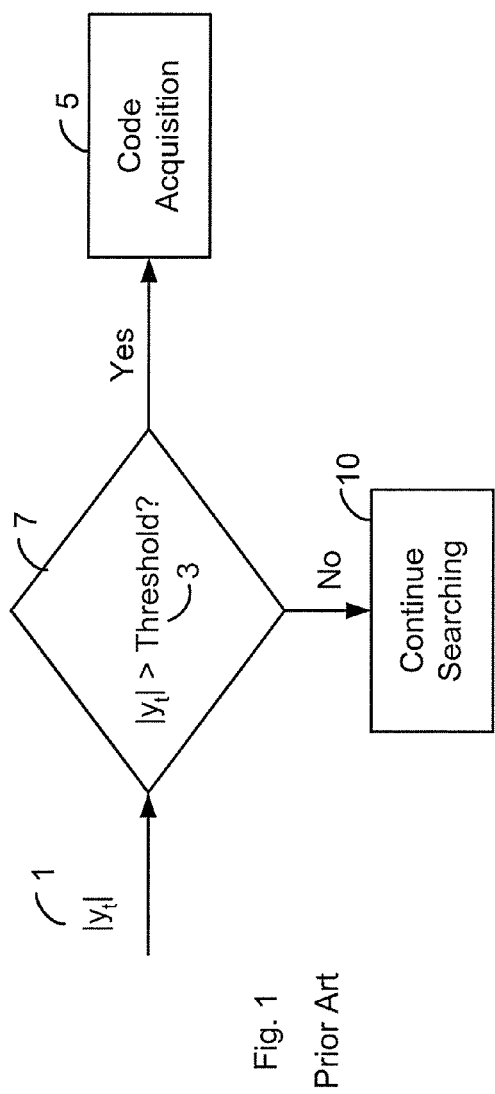
FIG. 1 illustrates the logic of code acquisition based on threshold comparison.
Figure 2:
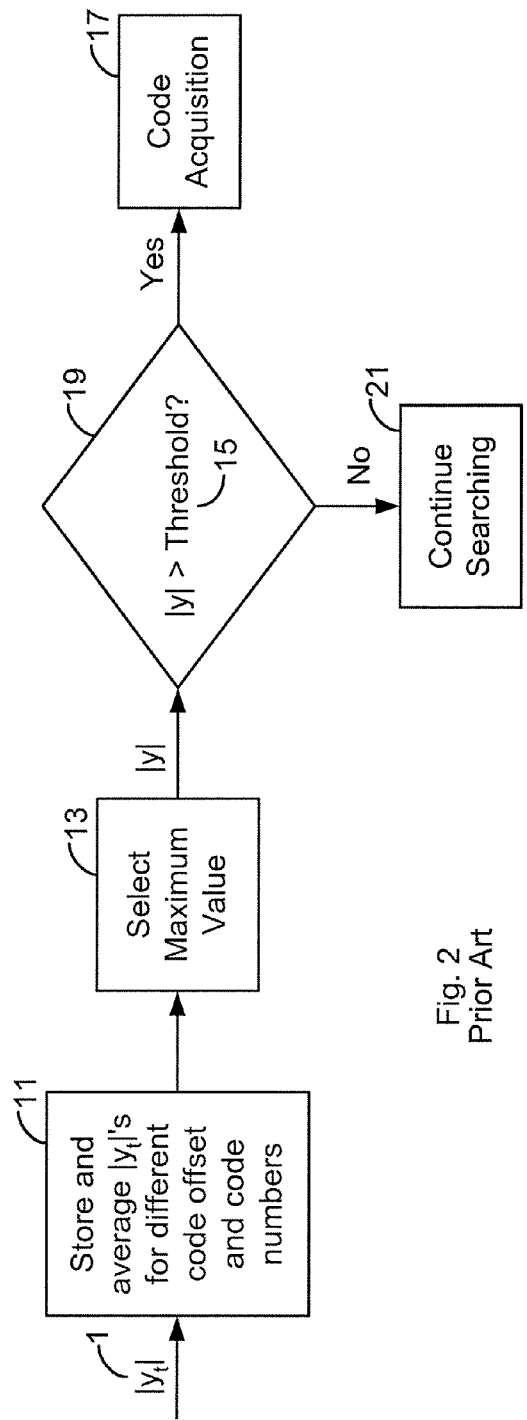
FIG. 2 illustrates the logic of code acquisition based on maximum selection.
Figure 3:
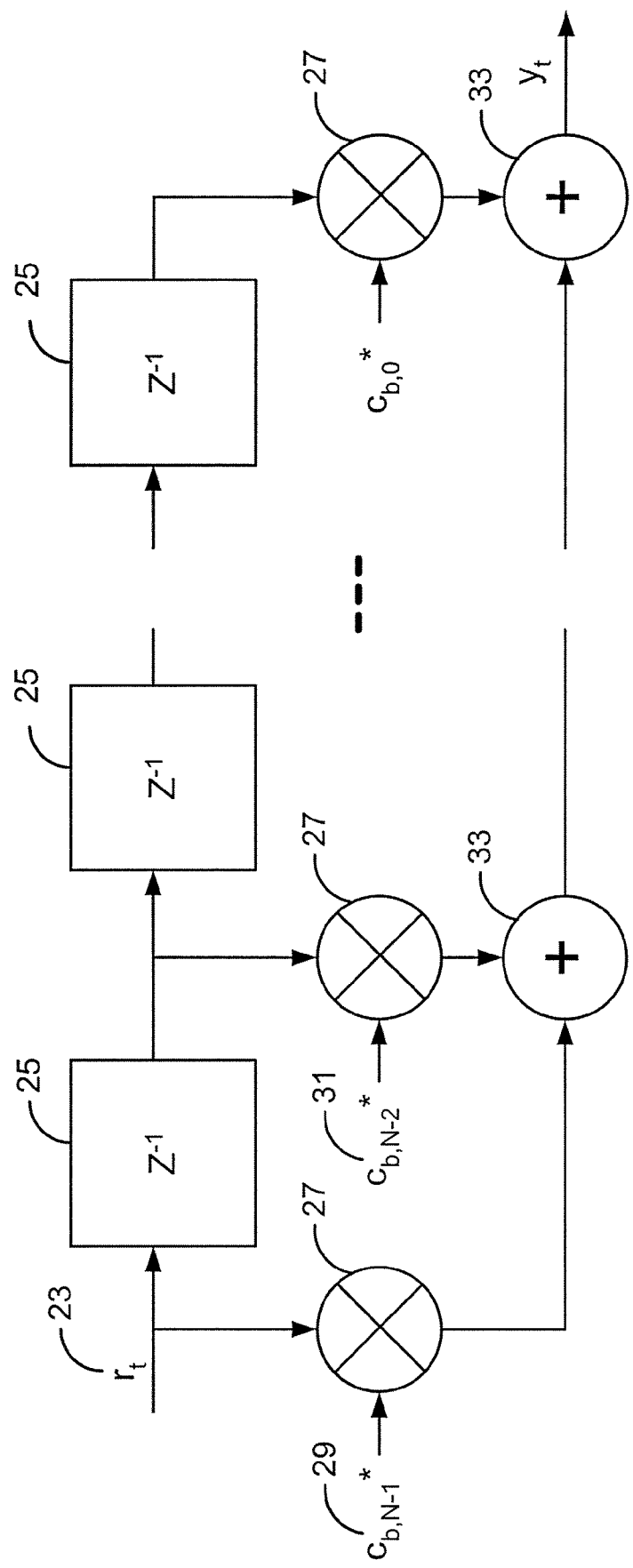
FIG. 3 shows the logic of a typical matched filter.
Figure 4:
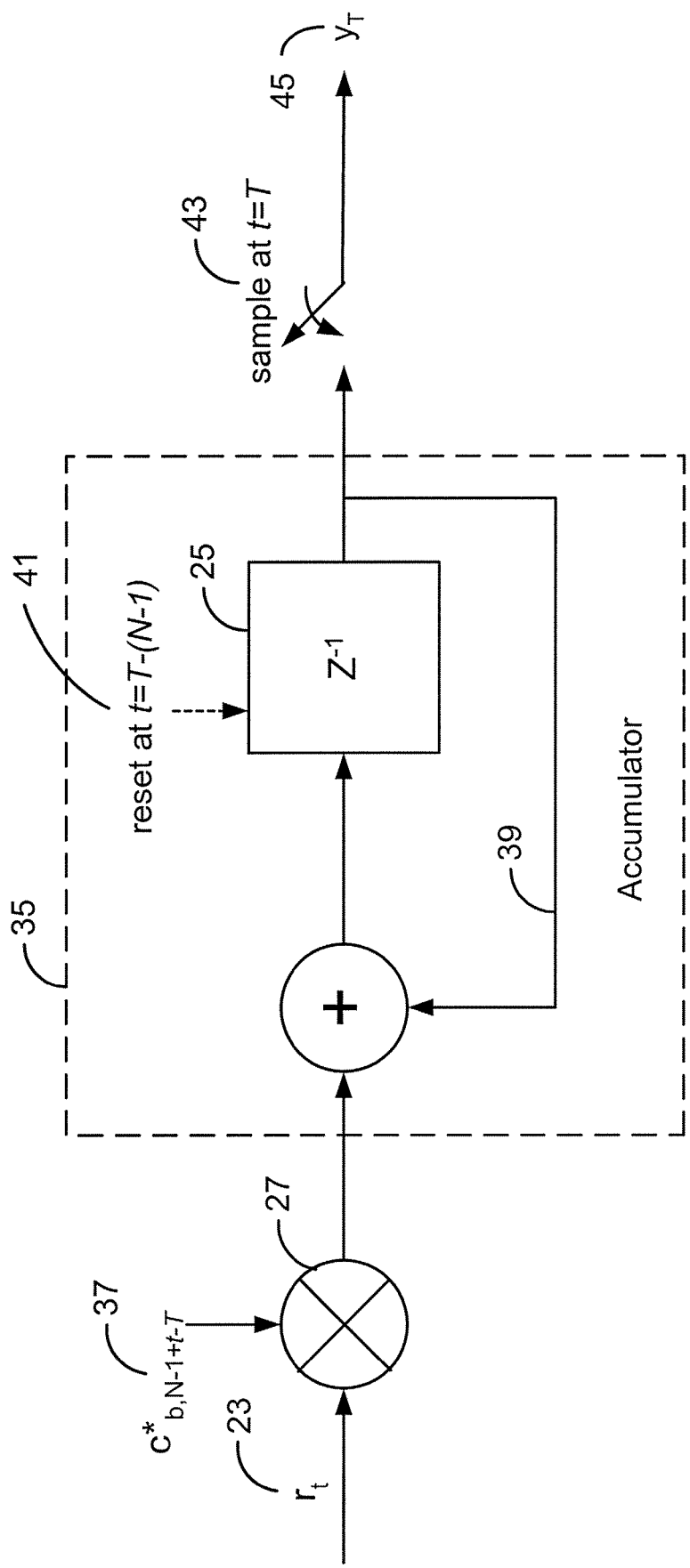
FIG. 4 shows the logic of a typical correlator.
Figure 5:
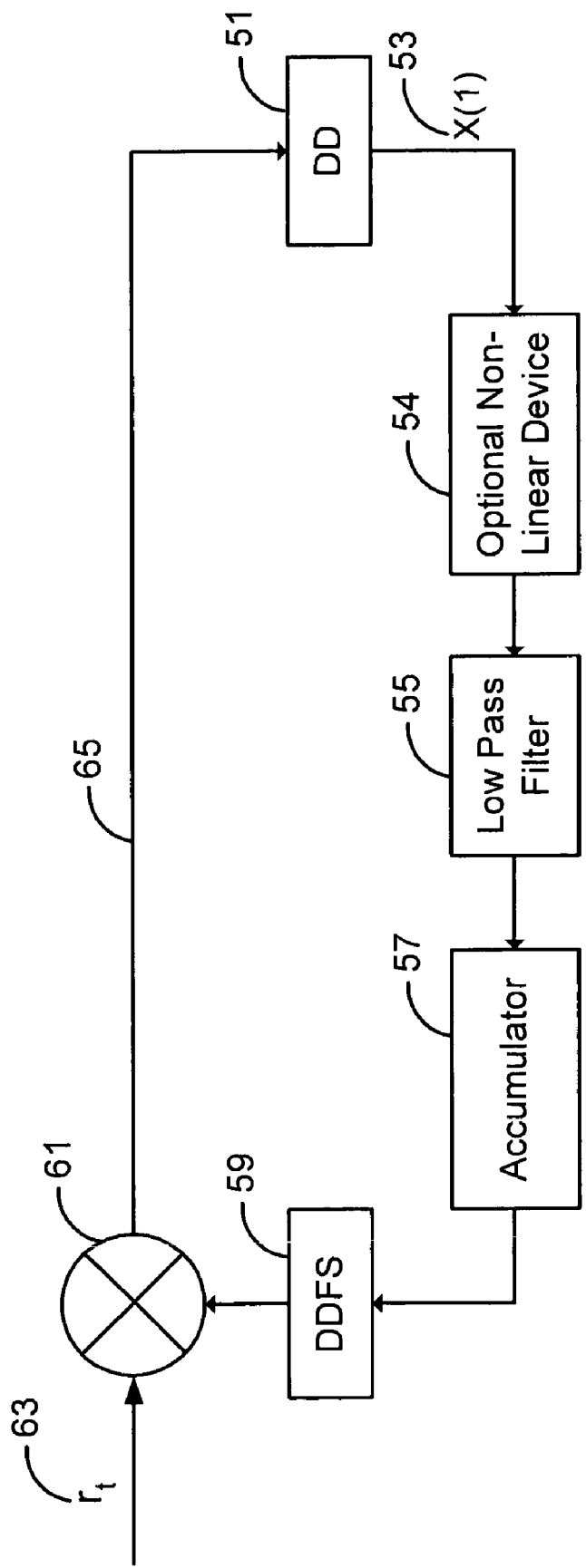
FIG. 5 illustrates the use of differential detection in a PLL architecture for frequency synchronization.
Figure 6:
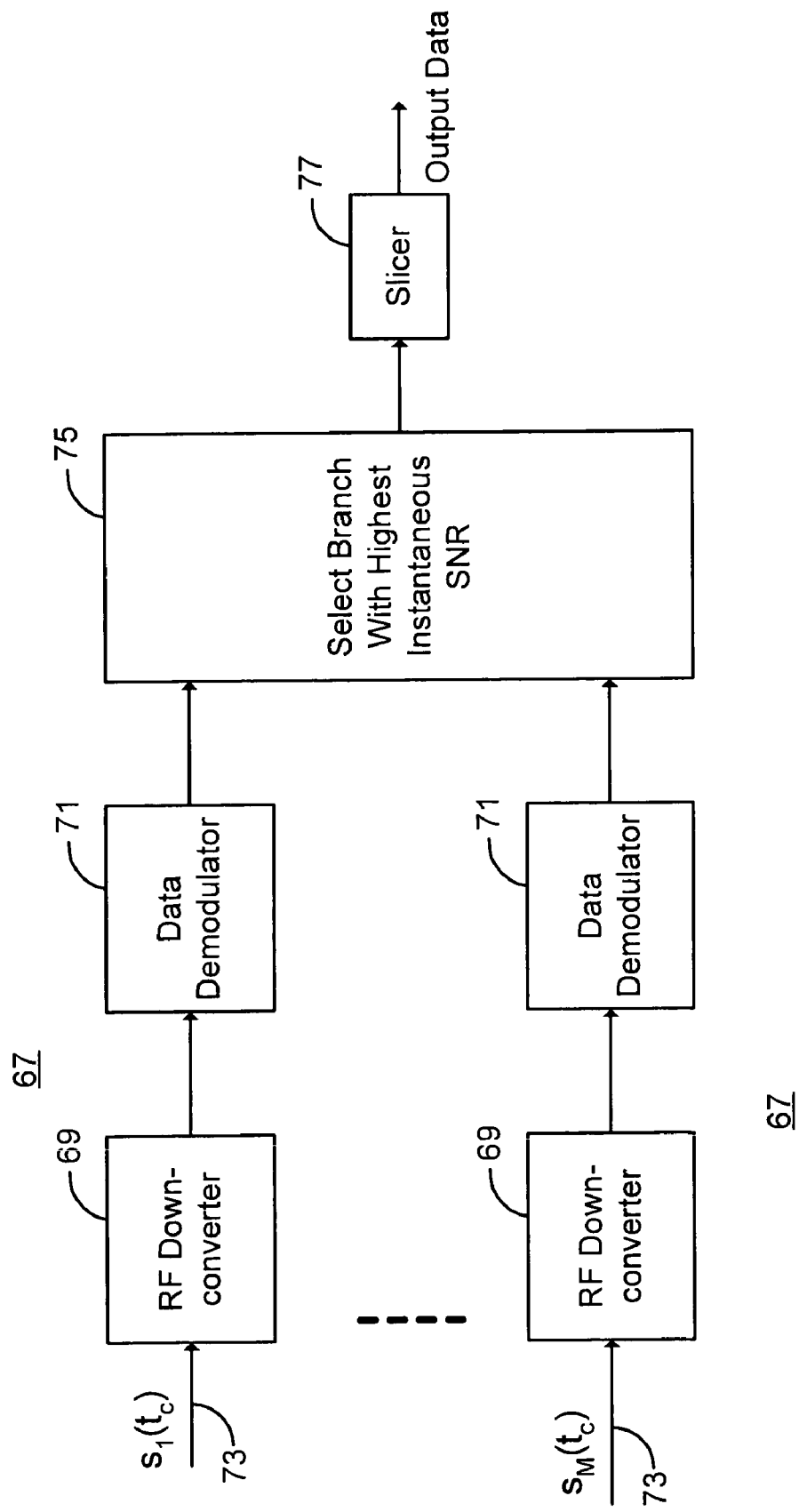
FIG. 6 illustrates a high level schematic/logic of a typical receiver using selection diversity.
Figure 7:
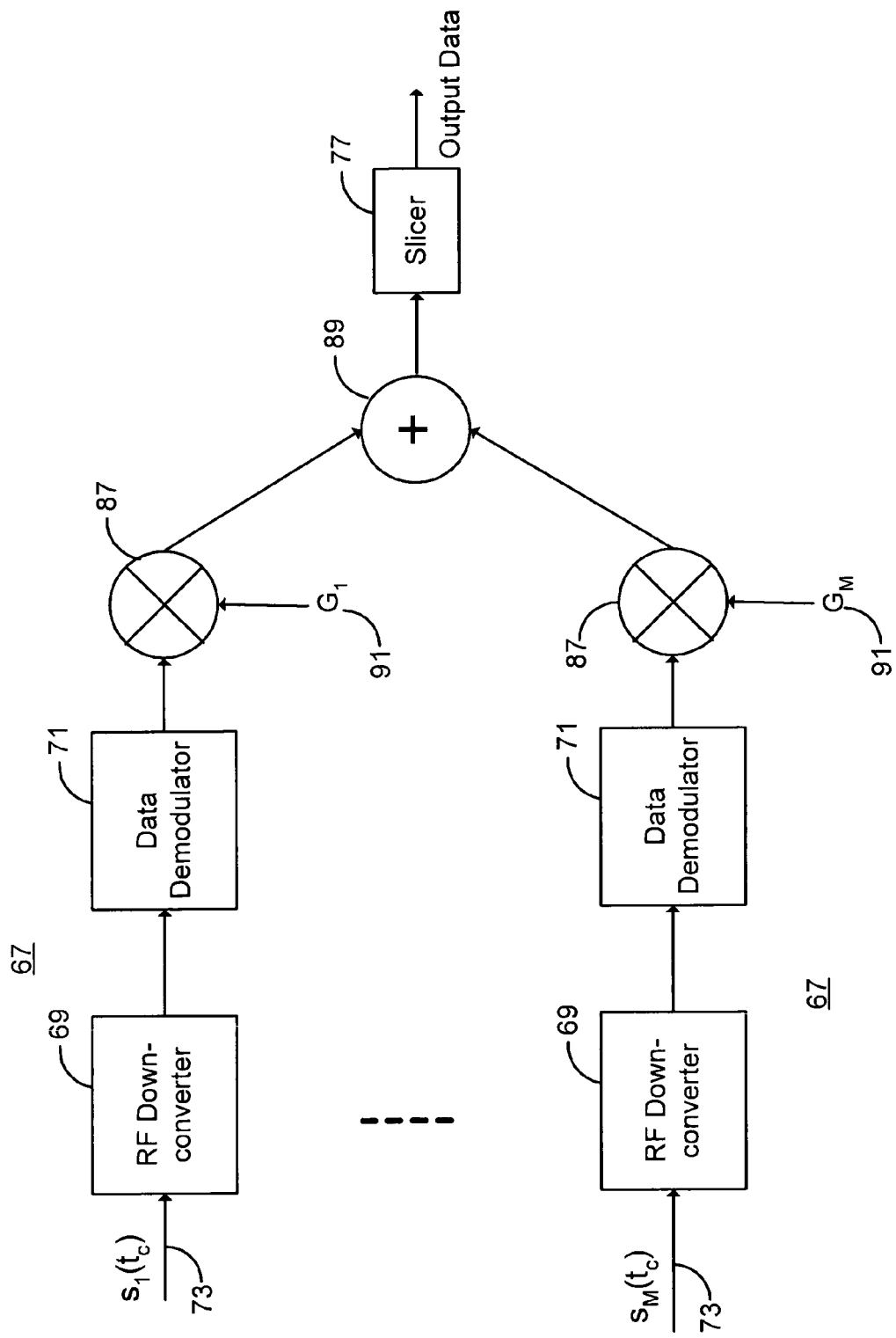
FIG. 7 illustrates a high level schematic/logic of a typical diversity receiver using maximal ratio combining.
Figure 8:
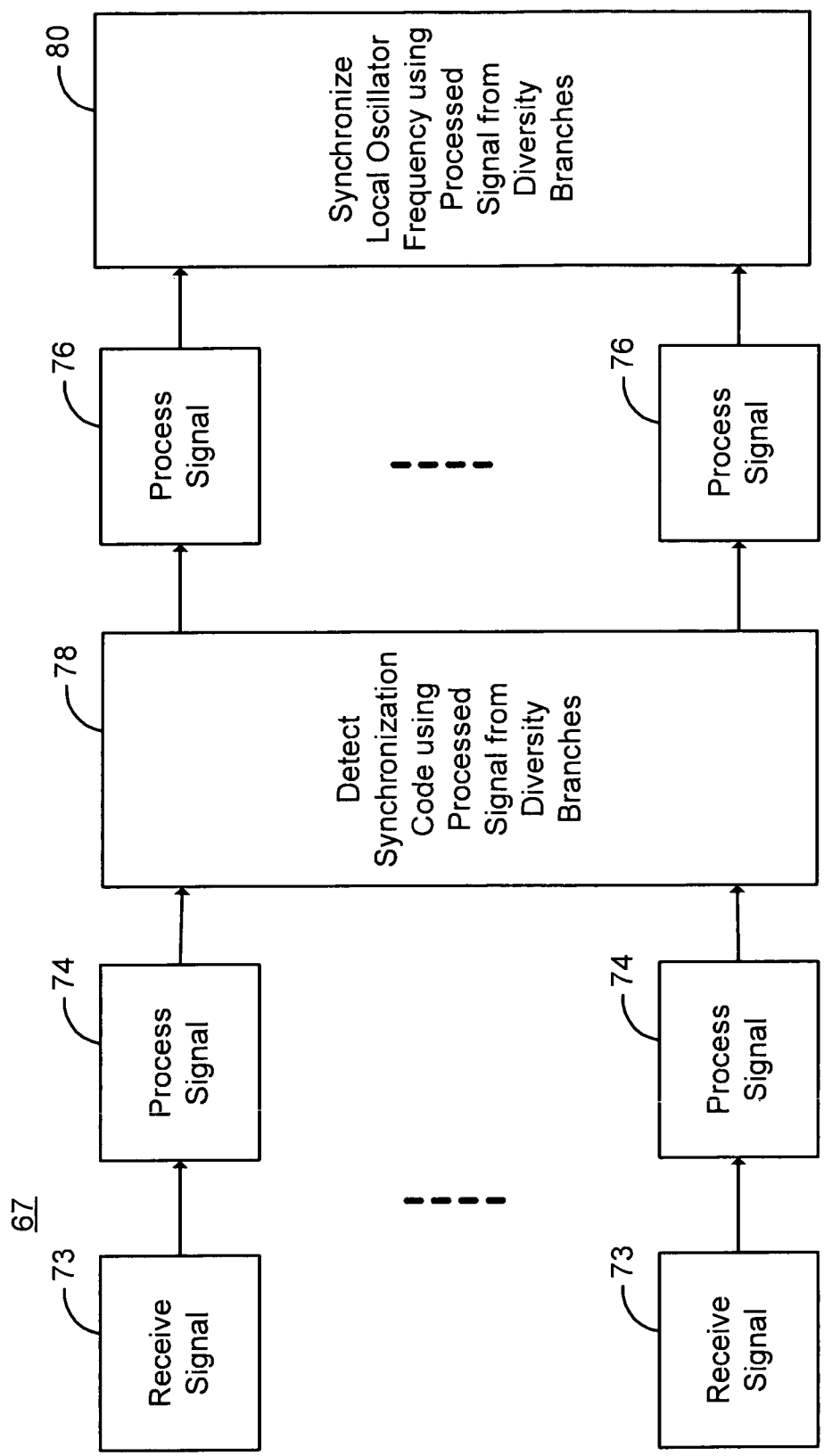
FIG. 8 illustrates a preferred logic for synchronization of a diversity receiver to a wireless network.

FIG. 8 illustrates a preferred logic for synchronizing a diversity mobile terminal to a wireless network.

In a preferred first step 73, a diversity mobile terminal comprising M diversity branches, receives a signal comprising a synchronization code transmitted by a wireless network.

In a preferred second step, the received signal is processed 74 in at least two diversity branches using a matched filter, partial matched filter, correlator, partial correlator or the equivalents thereof to determine 78 the synchronization code.

In a preferred third step, the received signal is processed 76 in at least two diversity branches to synchronize the frequency 80 of the mobile diversity terminal to the frequency of the wireless network based upon the determination of the synchronization code.

Preferred Methods of Code Synchronization

A preferred method for acquiring a synchronization code employs a selection diversity code synchronization receiver with M parallel diversity branches. Each diversity branch comprises at least one filter. As used herein, a filter is a matched filter, partial match filter, code correlator, partial code correlator or the equivalents thereof. A filter output, as used herein, is the output of a matched filter, code correlator or the equivalents thereof.

Assume that the received signal at the input of the $m^{th}$ filter at time instant t is given by $r_{m,t}$, where $1 \leq m \leq M$, and M is the number of diversity branches. Furthermore, assume that $c_{b,n}$, $n=0, \ldots, N-1$, is the synchronization code transmitted by the wireless network, b is the code number, and N is the length of the synchronization code. The output magnitude of the selection diversity code synchronization receiver, $|y_t|$, may be expressed as:

$$|y_t| = \max_{1 \leq m \leq M} \left| \sum_{n=0}^{N-1} r_{m,t-n} c^*_{b,N-1-n} \right|. \qquad \text{Equation 7}$$

Figure 9:
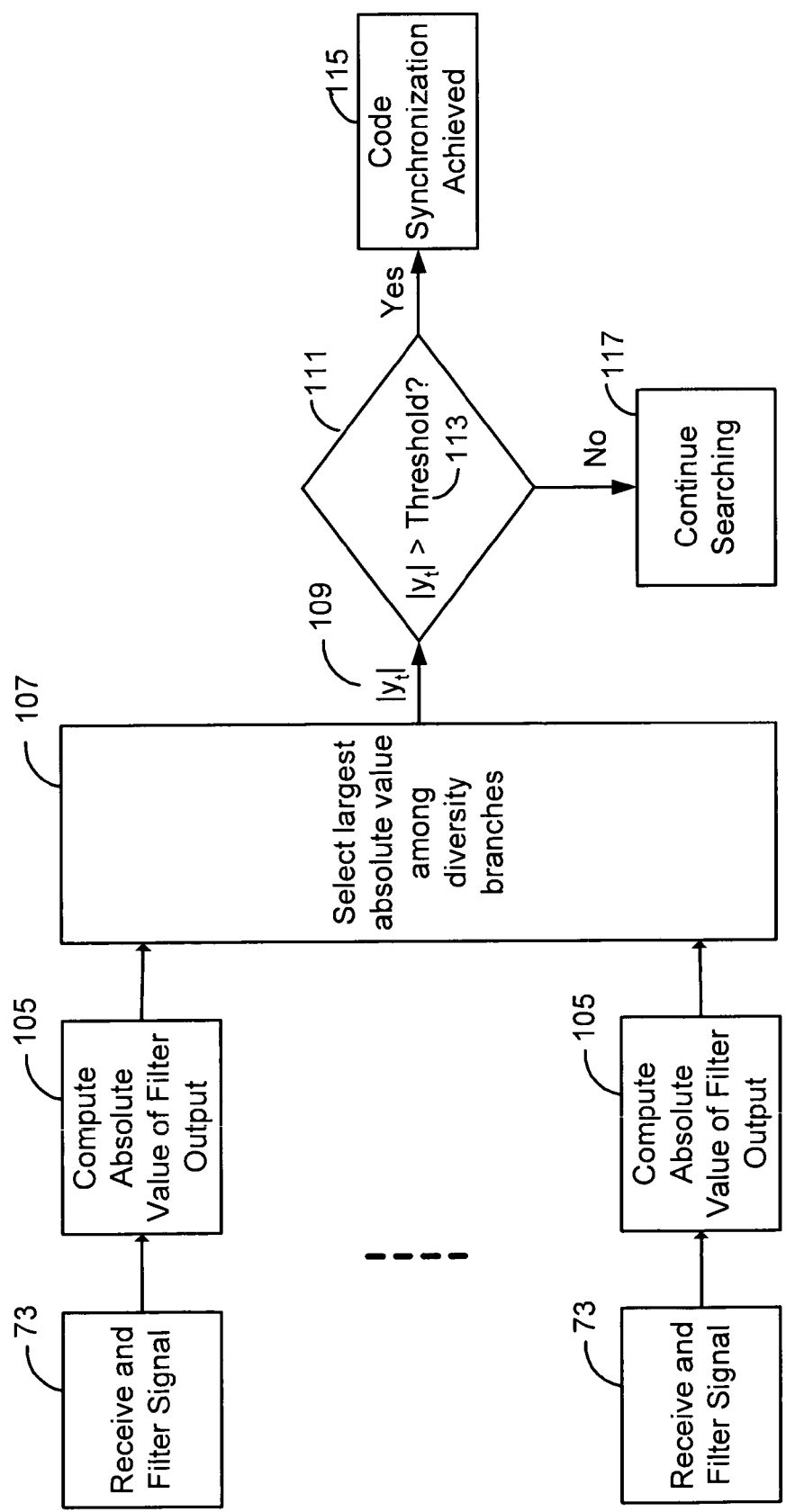
FIG. 9 illustrates a preferred logic for acquiring a code transmitted from a wireless network using a diversity receiver which employs selection diversity.

FIG. 9 illustrates a preferred logic for acquiring a code transmitted from a wireless network using a receive diversity mobile terminal employing a selection diversity code synchronization receiver.

In a preferred first step, the mobile terminal receives a signal comprising a synchronization code 73.

In a preferred second step, the mobile terminal computes the absolute value of a filter output 105 for each of the M diversity branches 67. Alternatively, other values that scale monotonically with the absolute value of a filter output including the magnitude square (power), the sum of the real and imaginary parts of the filter output, or any other approximation may also be computed.

In a preferred third step 107, the mobile terminal compares the M absolute values computed in the first step and selects which output had the highest instantaneous absolute value, thereby forming a selection diversity output value 109.

In a preferred fourth step 111, the highest instantaneous output value 109 of the matched filter/correlator is compared against a predetermined threshold 113. If the highest instantaneous output value exceeds the predetermined threshold value, code synchronization is accomplished 115. If the instantaneous output value does not exceed the predetermined threshold, code detection continues 117.

Instead of a threshold comparison method, other methods, well known in the art, including maximum selection, multi-dwell, or multi-stage code acquisition may also be employed to determine whether code determination has been achieved.

The corresponding methods describing the output of a selection diversity code synchronization receiver comprising a correlator and/or logic for code synchronization in the presence of frequency offset may be developed by one skilled in the art.

Another preferred method for acquiring a synchronization code employs a non-coherent combining diversity code synchronization receiver with M parallel diversity branches. This preferred method, has a variation, which employs a non-coherent weighted combining diversity code synchronization receiver with M parallel diversity branches. Each diversity branch comprises at least one filter.

Assume that the received signal at the input of the $m^{th}$ filter at time instant t is given by $r_{m,t}$. The output magnitude of the non-coherent combining diversity code synchronization receiver $|y_t|$ is given by:

$$|y_t| = \sum_{m=1}^{M} \left| \sum_{n=0}^{N-1} r_{m,t-n} c_{b,N-1-n}^* \right| . \quad \text{Equation 8}$$

In the preferred method employing non-coherent weighted combining diversity, further assume that $p_m$ is the instantaneous average power for the $m^{th}$ diversity branch. The output magnitude of the non-coherent weighted combining diversity code synchronization receiver $|y_t|$ may be expressed as:

$$|y_t| = \sum_{m=1}^{M} p_m \left| \sum_{n=0}^{N-1} r_{m,t-n} c_{b,N-1-n}^* \right| \quad \text{Equation 9}$$

Figure 10:
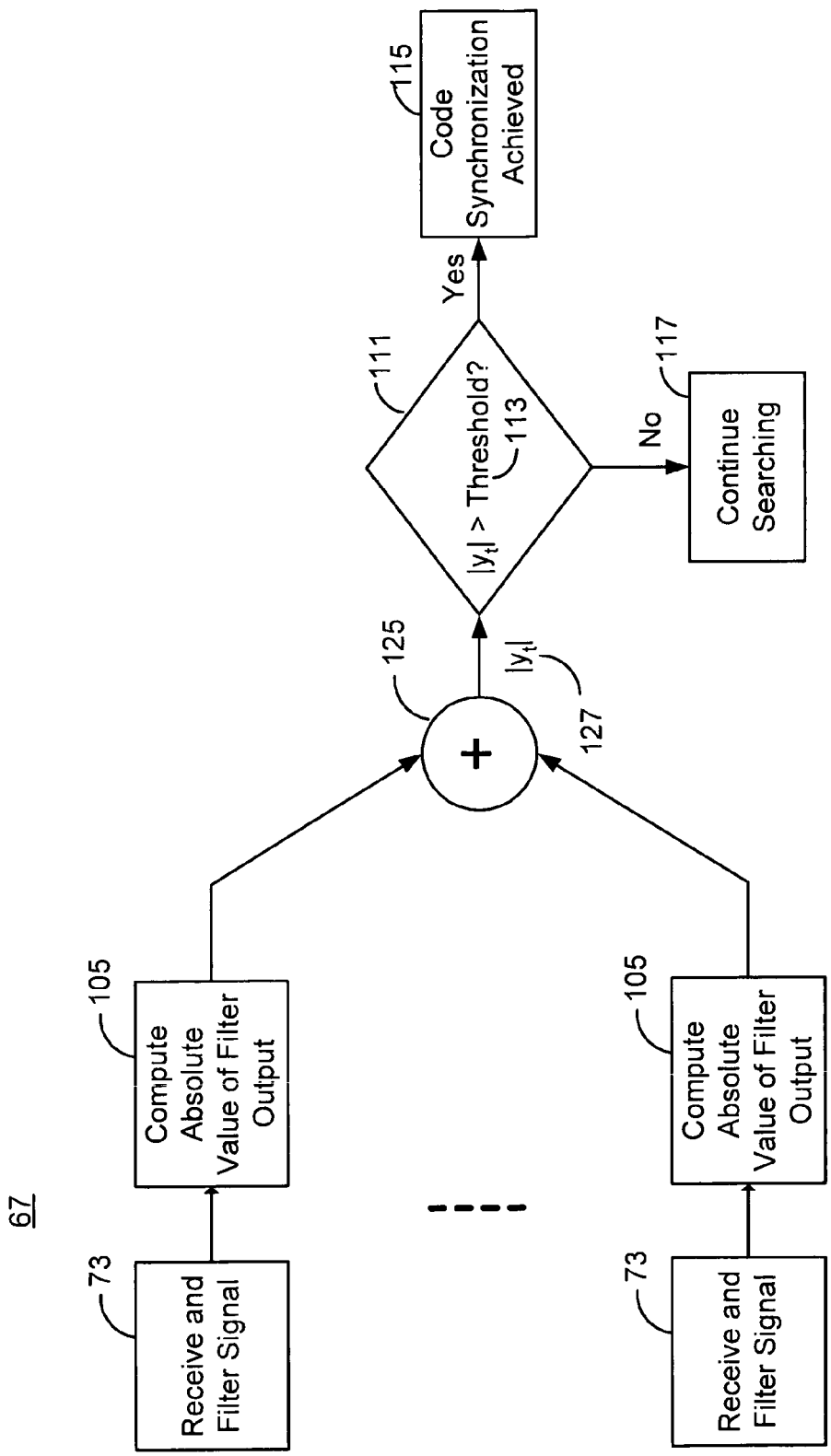
FIG. 10 illustrates another preferred logic for acquiring a code transmitted from a wireless network using a diversity receiver which employs non-coherent combination.
Figure 11:
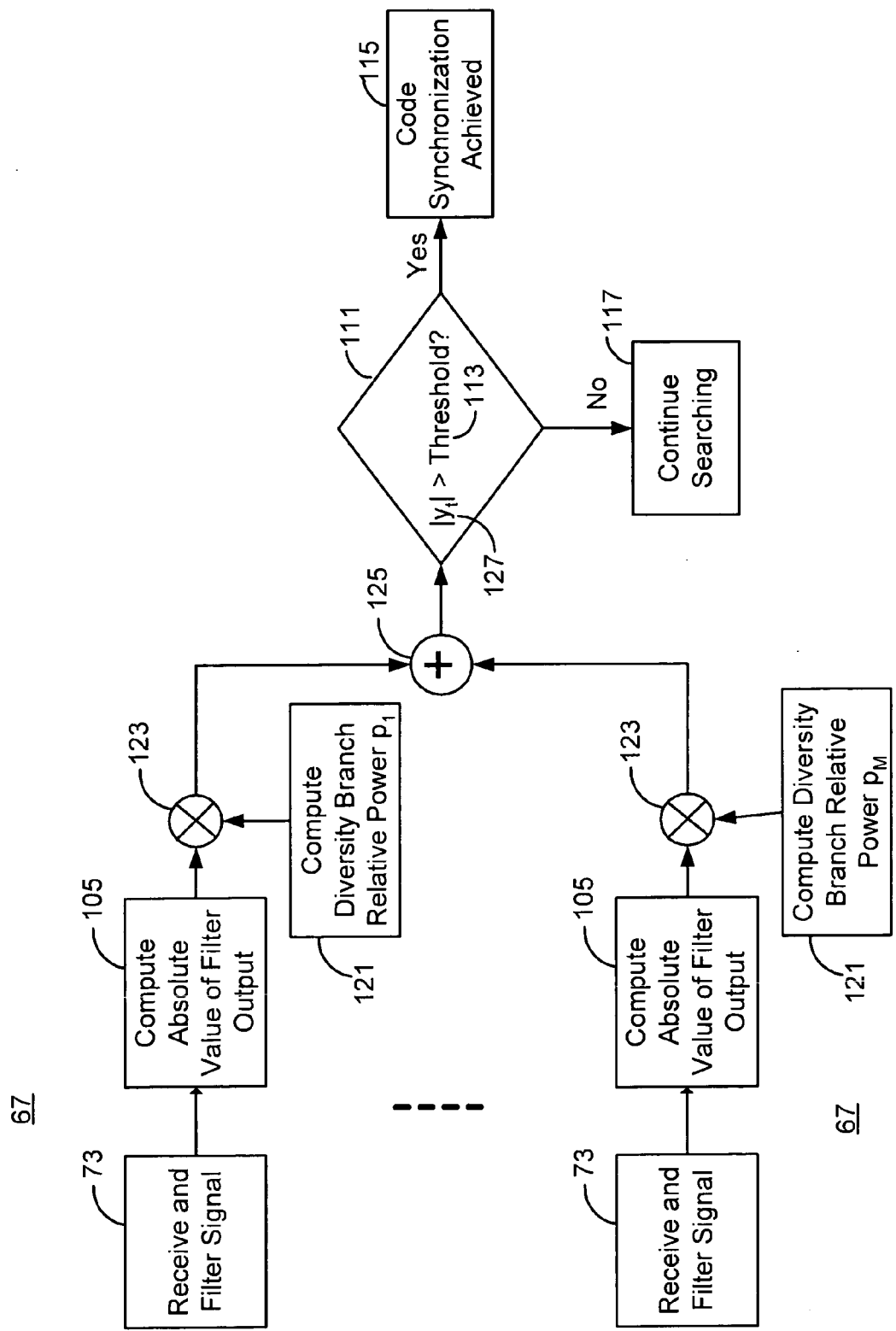
FIG. 11 illustrates another preferred logic for acquiring a code transmitted from a wireless network using a diversity receiver which employs non-coherent weighted combination.

FIGS. 10 and 11 show a preferred logic for acquiring a code transmitted from a wireless network using a diversity mobile terminal employing non-coherent combination and non-coherent weighted combination, respectively.

In a preferred first step, the mobile terminal receives a signal comprising a synchronization code 73.

In a preferred second step, the mobile terminal computes the absolute value of a filter output 105 for each of the M diversity branch 67. Alternatively, other values that scale monotonically with the absolute value of a filter output including the magnitude square (power), the sum of the real and imaginary parts of the filter output, or any other approximation may also be computed.

In the weighted variation, the second step further comprises 1) determining, for each of the M diversity branches, 67 an estimate of the relative power $p_m$ 121 of each diversity branch 67 relative to the other branches, and 2) weighting 123 the output magnitude 105 for each of the M diversity branches 67 by the relative power 121 of each diversity branch relative 67 to the other branches.

In a preferred third step, the weighted/non-weighted output magnitudes 105, 123 determined in step 2 are combined 125 thereby forming a weighted/non-weighted non-coherent combining diversity output value 127.

In a preferred fourth step, the weighted/non-weighted non-coherent combining diversity output value 105, 123 is compared 111 against a predetermined threshold 113. If this diversity output value 105, 123 exceeds the predetermined threshold value 113, code synchronization is accomplished 115. If this diversity output value 105, 123 does not exceed the predetermined threshold 113, code detection continues 117.

Instead of a threshold comparison method, other methods, well known in the art, including maximum selection, multi-dwell, or multi-stage code acquisition may also be employed to determine whether code determination has been achieved.

The corresponding methods describing the output of a non-coherent combining diversity code synchronization receiver or the non-coherent weighted combining diversity code synchronization receiver comprising a correlator and/or logic for code synchronization in the presence of frequency offset may be developed by one skilled in the art.

Another preferred method for acquiring a synchronization code employs a diversity code synchronization receiver with M parallel diversity branches and coherent antenna combination. For code synchronization using coherent antenna combination, it is assumed that a reference signal is available. Each diversity branch generally comprises at least one filter.

Assume that the received signal at the input of the $m^{th}$ filter at time instant t is given by $r_{m,t}$ and $c_m^0$ is the channel estimate for the $m^{th}$ diversity branch. The output magnitude of the coherent combining diversity code synchronization receiver $|y_t|$ is given by:

$$|y_t| = \sum_{m=1}^{M} \text{Real}\left( c_m^{0*} \sum_{n=0}^{N-1} r_{m,t-n} c_{b,N-1-n}^* \right) \quad \text{Equation 10}$$

Figure 12:
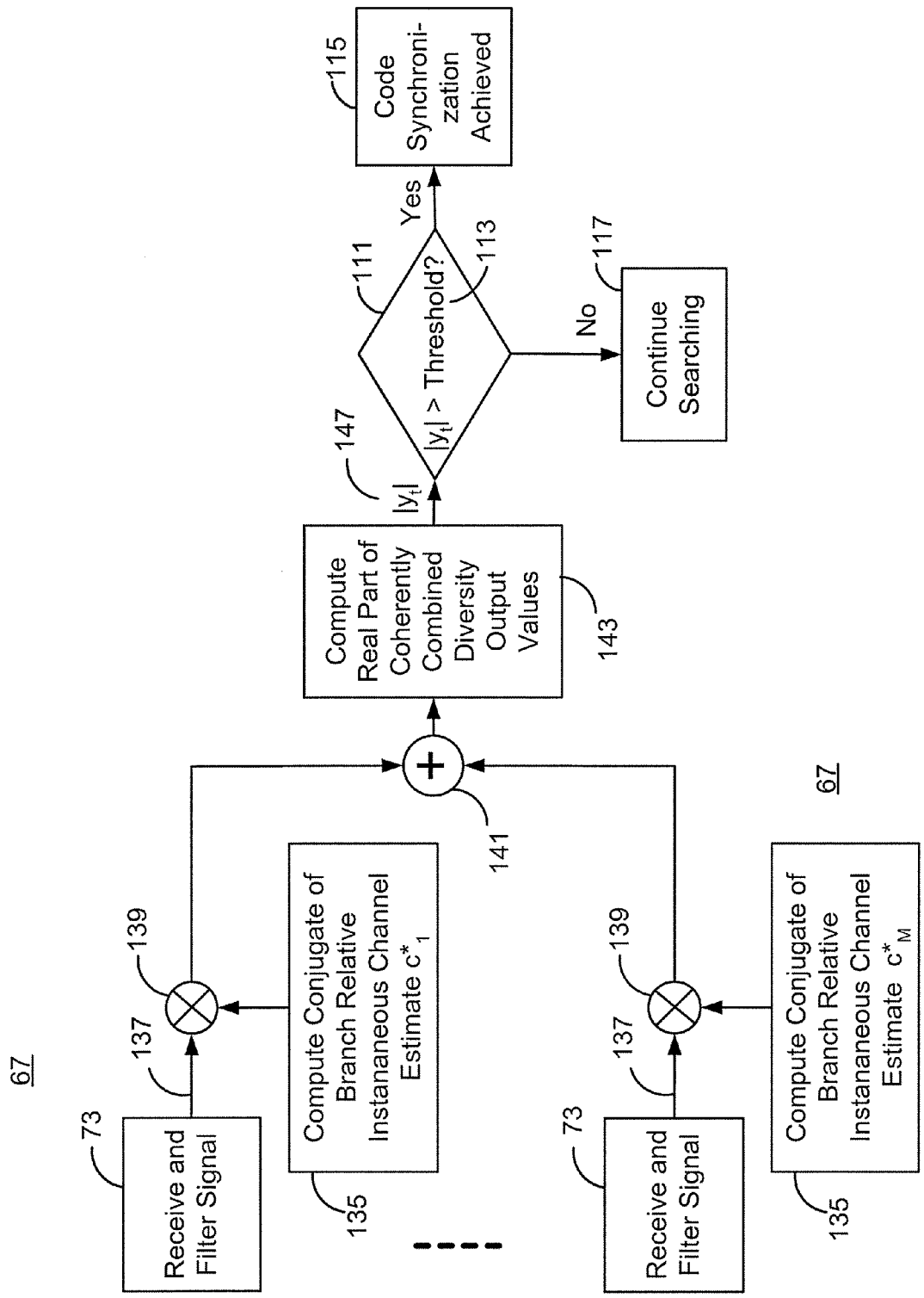
FIG. 12 illustrates another preferred logic for acquiring a code transmitted from a wireless network using a diversity receiver which employs coherent combination.

FIG. 12 shows preferred logic for acquiring a code transmitted from a wireless network using a receive diversity mobile terminal employing coherent combination.

In a preferred first step, the mobile terminal receives a signal comprising a synchronization code 73.

In a preferred second step, the mobile terminal updates, for each of the M diversity branches 67, the instantaneous parallel channel estimate 135 of the diversity branch relative to the other branches.

In a preferred third step, for each of the M diversity branches 67, the filter output 137 is co-phased and weighted 139 by the conjugate of the instantaneous parallel channel estimate 135 of the diversity branch relative to the other branches.

In a preferred fourth step, the co-phased and weighted values from the M diversity branches are combined 141, thereby forming a coherent combining diversity output value.

In a preferred fifth step, the real part of the coherent combining diversity output value is computed 143.

In a preferred sixth step, the real part of the coherent combining diversity output value 147 is compared 111 against a predetermined threshold 113. If this value 147 exceeds the predetermined threshold value 113, code synchronization is accomplished 115. If this value 147 does not exceed the predetermined threshold 113, code detection continues.

Instead of a threshold comparison method, other methods, well known in the art, including maximum selection, multi-dwell, or multi-stage code acquisition may also be employed to determine whether code determination has been achieved.

Methods describing the output of a coherent combining diversity code synchronization receiver comprising a correlator and/or logic for code synchronization in the presence of frequency offset may be easily developed by one skilled in the art.

Preferred Methods of Frequency Synchronization

A preferred method for acquiring the frequency offset of the transmitted synchronization code employs a Fourier Transform (FT) selection diversity frequency synchronization receiver with M parallel diversity branches. Each diversity branch generally comprises at least one filter and at least one FT unit. One method according to the invention, employs a correlator for the filter.

Assume that the K partial code correlations of length L for the $m^{th}$ diversity branch are given by $y_{m,k}, \ldots, y_{m,k+K-1}$, where k is the correlator output time index. Then the output magnitude of the selection diversity FT frequency synchronization receiver $|X(p)|$ may be expressed as:

$$|X(p)| = \max_{1 \le m \le M} \left| \sum_{l=k}^{k+K-1} y_{m,l} e^{-j2\pi pl/P} \right| \quad 0 \le p < P. \quad \text{Equation 11}$$

Figure 13:
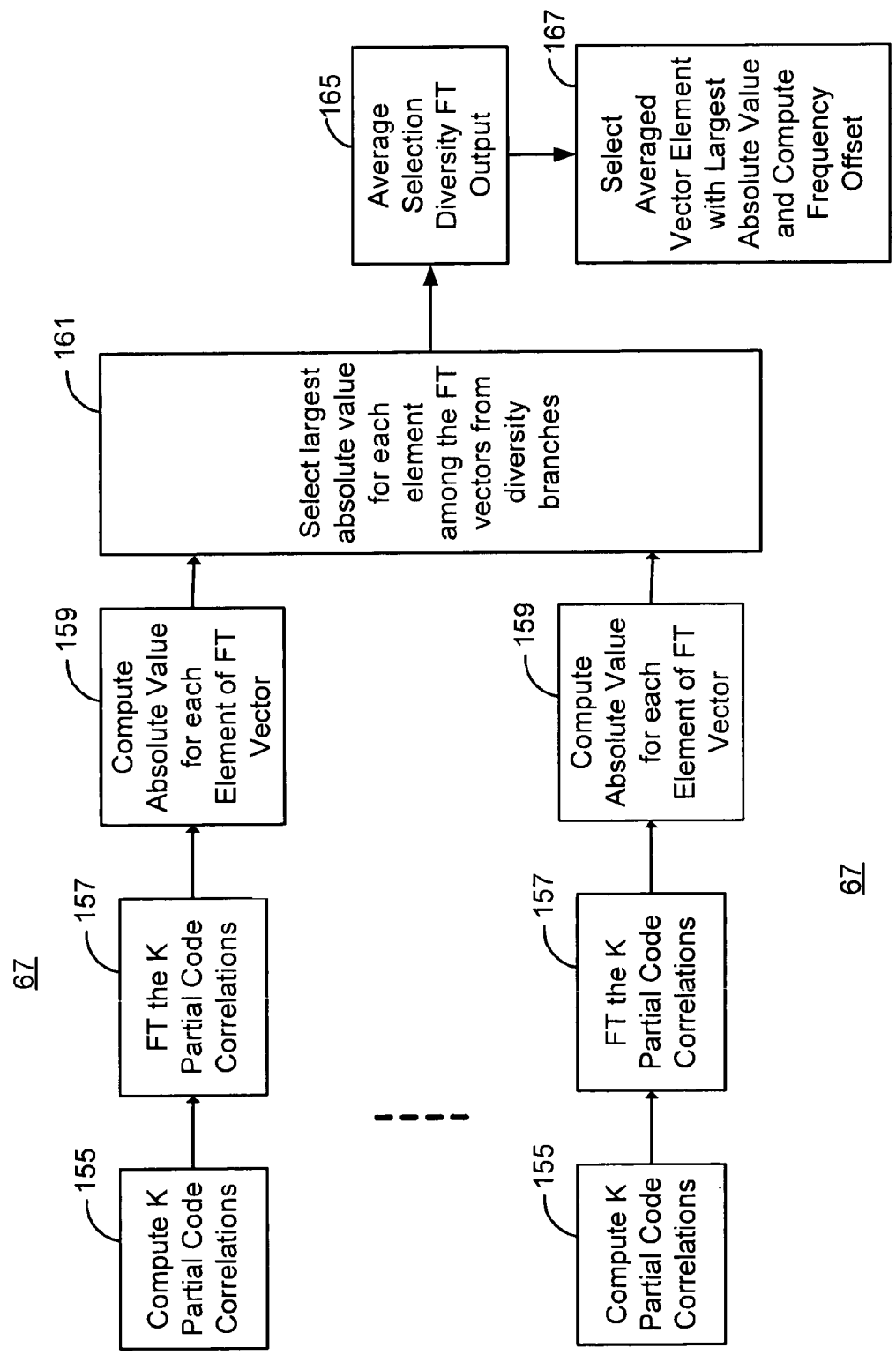
FIG. 13 illustrates one preferred method for acquiring frequency synchronization from a code transmitted from a wireless network using a diversity receiver which employs selection diversity and a FT Transform to determine the frequency offset of the transmitted code.

FIG. 13 shows a preferred logic for acquiring the frequency offset of a transmitted code using a Fourier Transform selection diversity frequency synchronization receiver with M diversity branches and wherein each diversity branch comprises a correlator and a FT unit.

In a preferred first step 155 the mobile terminal determines and accumulates K partial code correlations for each diversity branch 67. In preferred second step 157, the mobile terminal Fourier transforms the K partial code correlations in each diversity branch 67. In a preferred third step 159, the mobile terminal computes, for each of the M diversity branches 67, the absolute value of the Fourier Transform results for each of the P elements of the Fourier Transform vector.

In a preferred fourth step 161, the mobile terminal selects, for each element p of the Fourier Transform magnitude vector 159, the value from the M diversity branches 67 with the highest instantaneous absolute value 159, and creates a new selection diversity FT vector |X(p)|.

In a preferred fifth step 165, the selection diversity FT vector |X(p)| is averaged over multiple FT blocks.

In a preferred sixth step 167, the element p with the largest averaged absolute value is selected as the frequency offset estimate from the selection diversity frequency synchronization receiver.

Another preferred method for acquiring the frequency offset of the transmitted code employs a Fourier Transform (FT) non-coherent diversity frequency synchronization receiver with M parallel diversity branches. A variation of this method may employ a Fourier Transform (FT) non-coherent weighted combining diversity frequency synchronization receiver with M parallel diversity branches. Each diversity branch generally comprises a filter and a FT unit. One method according to the invention employs a correlator for a filter.

Assume that the K partial code correlation of length L for the $m^{th}$ diversity branch are given by $y_{m,k}, \ldots, y_{m,k+K-1}$, where k is the correlator output time index. Then the output magnitude of the non-coherent combining diversity FT frequency synchronization receiver |X(p)| is given by:

$$|X(p)| = \sum_{m=1}^{M} \left| \sum_{l=k}^{k+K-1} y_{m,l} e^{-j2\pi pl/P} \right| \quad 0 \le p < P. \quad \text{Equation 12}$$

In the method employing a weighted non-coherent combining diversity receiver, assume that $p_m$ is the instantaneous average power for the $m^{th}$ diversity branch. The output magnitude of the non-coherent weighted combining diversity FT frequency acquisition receiver |X(p)| may be expressed as:

$$|X(p)| = \sum_{m=1}^{M} p_m \left| \sum_{l=k}^{k+K-1} y_{m,l} e^{-j2\pi pl/P} \right| \quad 0 \le p < P. \quad \text{Equation 13}$$

Figure 14:
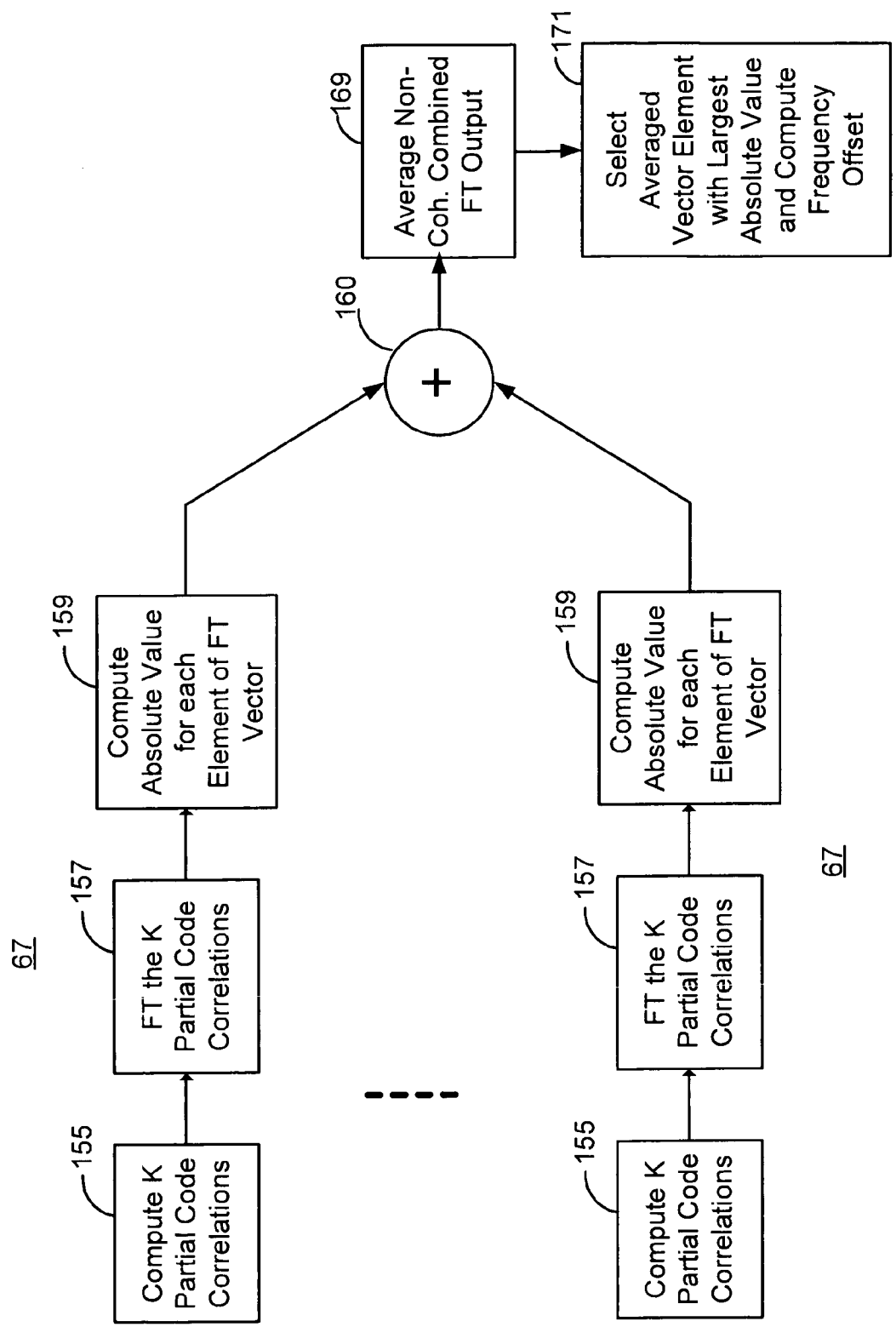
FIG. 14 illustrates one preferred method for acquiring frequency synchronization from a code transmitted from a wireless network using a diversity receiver which employs non-coherent combining diversity and a Fourier Transform to determine the frequency offset of the transmitted code.
Figure 15:
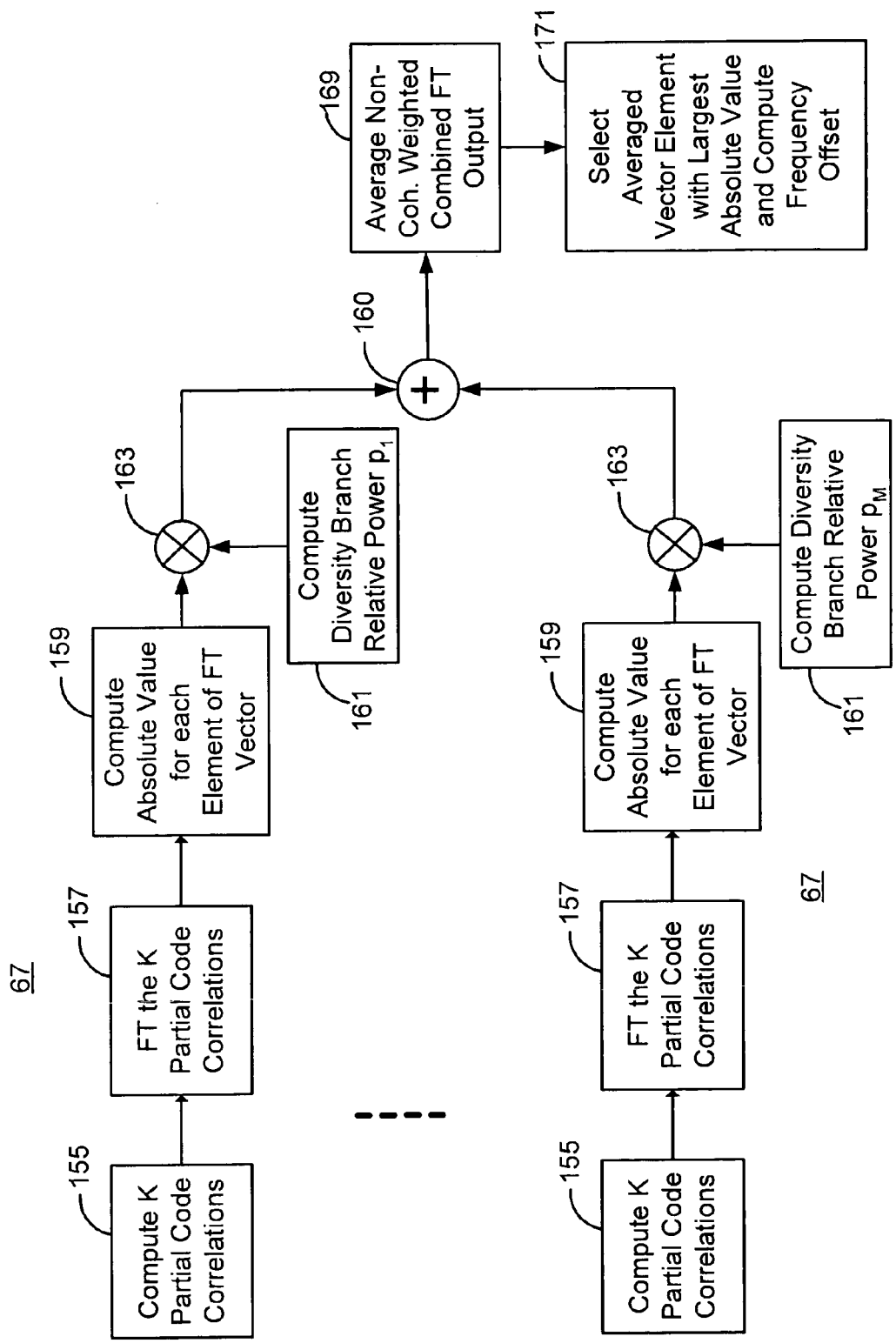
FIG. 15 illustrates one preferred method for acquiring frequency synchronization from a code transmitted from a wireless network using a diversity receiver which employs non-coherent weighted combining diversity and a Fourier Transform to determine the frequency offset of the transmitted code.

FIGS. 14 and 15 show a preferred logic for acquiring the frequency offset of the transmitted code using a non-weighted (FIG. 14) and weighted (FIG. 15) Fourier Transform non-coherent combining diversity frequency synchronization receiver with M diversity branches and wherein each diversity branch comprises a correlator and a FT unit.

In a preferred first step 155, the mobile terminal determines and accumulates K partial code correlations in each diversity branch. In a preferred second step 157, the mobile terminal Fourier transforms the K partial code correlation in each diversity branch 67. In a preferred third step 159, the mobile terminal computes, for each of the M diversity branches 67, the absolute value of the Fourier Transform results for each of the P elements of the Fourier Transform vector.

In the method employing a weighted non-coherent combining diversity receiver, a preferred third step 159 further comprises: 1) computing, for each of the M diversity branches 67, an estimate of the relative power 161 of the diversity branch relative to the other branches, and 2) weighting 163 each of the M diversity branches by the relative power of each diversity branch relative to the other branches of the absolute value of the Fourier Transform results for each of the P elements of the Fourier Transform vector.

In a preferred fourth step 160, the mobile terminal combines, for each element p of the Fourier Transform magnitude vector, the values from the M diversity branches obtained in step 1, and creates a new non-coherent combining diversity FT vector |X(p)|.

In a preferred fifth step 169, the non-coherent combining diversity FT vector |X(p)| is averaged over multiple FT blocks.

In a preferred sixth step 171, the element p with the largest averaged absolute value is selected as the frequency offset estimate used for frequency synchronization.

Another preferred method for acquiring the frequency offset of the transmitted code employs a Differential Detection (DD) selection diversity frequency synchronization receiver with M parallel diversity branches. Each diversity branch comprises at least one filter and at least one DD unit. One method according to the invention employs a correlator for the filter.

Assume that the partial code correlation of length L for the $m^{th}$ diversity branch is given by $y_{m,k}$, where k is the correlator output time index. Accordingly, the DD selection diversity frequency acquisition receiver output X(k) may be expressed as:

$$\hat{m}(k) = \arg\max_{1 \le m \le M} |y_{m,k} y^*_{m,k-1}|$$

$$X(k) = y_{\hat{m}(k),k} y^*_{\hat{m}(k),k-1} \quad \text{Equation 14}$$

Figure 16:
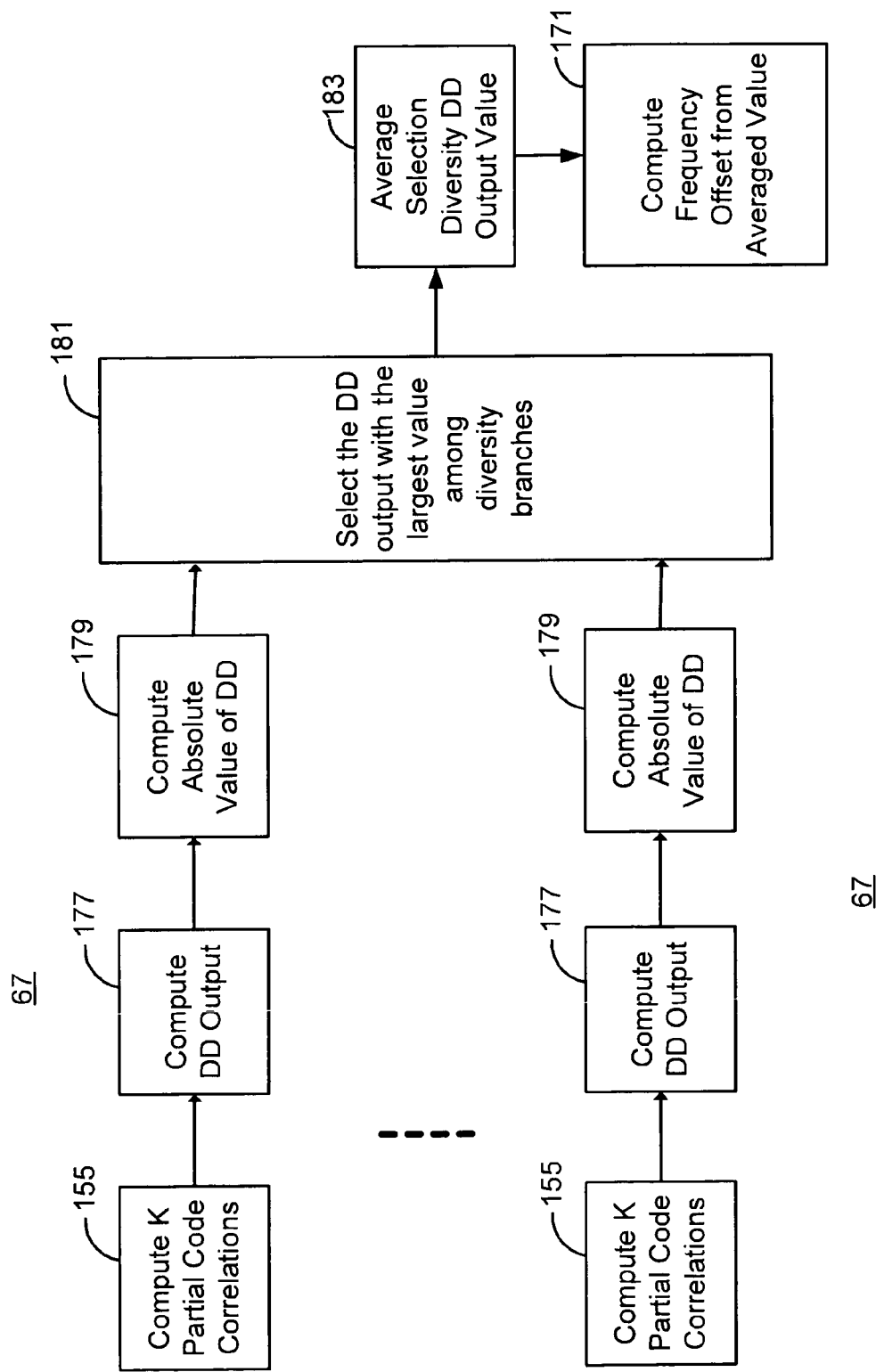
FIG. 16 illustrates one preferred method for acquiring frequency synchronization from a code transmitted from a wireless network using a diversity receiver which employs selection diversity and differential detection to determine the frequency offset of the transmitted code.

FIG. 16 shows a preferred logic for acquiring the frequency offset of the transmitted code using a diversity mobile terminal employing a Differential Detection (DD) selection diversity frequency synchronization receiver, with M diversity branches and wherein each diversity branch comprises a correlator.

In a preferred first step 177, the mobile terminal determines $y_{m,k}$ over a range of k values in each diversity branch m.

In a preferred second step 181, for each DD output (i.e., for each time index k), the mobile terminal selects the diversity branch with the highest instantaneous absolute value 179.

In a preferred third step 183, DD output of the selected branch is averaged over multiple DD output s.

In a preferred fourth step, 171, the averaged DD value is used to compute the frequency estimate.

The DD detection method outlined above may also generally be implemented with a phase locked loop.

Another preferred method for acquiring the frequency offset of the transmitted code employs a Differential Detection (DD) coherent combining diversity frequency synchronization receiver with M parallel diversity branches. An alternative method may employ a weighted coherent combining diversity receiver with M parallel diversity branches. Each diversity branch comprises at least one filter and at least one DD unit. One method according to the invention employs a correlator for the filter.

Assume that the partial code correlation of length L for the $m^{th}$ diversity branch is given by $y_{m,k}$, where k is the correlator output time index. Accordingly, a DD coherent combining diversity frequency synchronization receiver output X(k) may be expressed as:

$$X(k) = \sum_{m=1}^{M} y_{m,k} y_{m,k-1}^* \qquad \text{Equation 15}$$

In the method employing a weighted coherent combining diversity receiver, assume that $p_m$ is the instantaneous average power for the $m^{th}$ diversity branch. Accordingly, the DD coherent weighted combining diversity frequency synchronization receiver output X(k) may be expressed as:

$$X(k) = \sum_{m=1}^{M} p_m y_{m,k} y_{m,k-1}^* \qquad \text{Equation 16}$$

Figure 17:
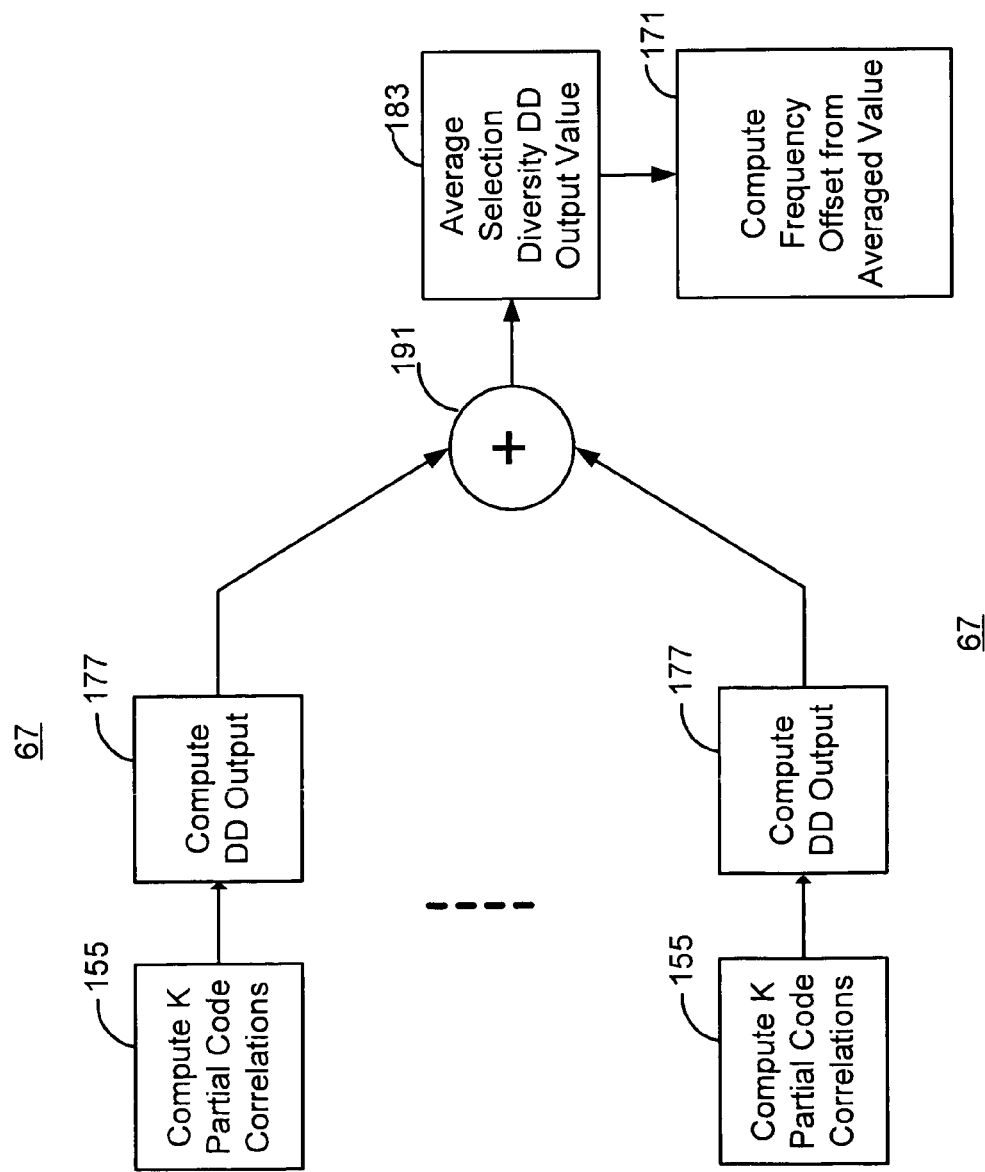
FIG. 17 illustrates one preferred method for acquiring frequency synchronization from a code transmitted from a wireless network using a diversity receiver which employs coherent combining diversity and differential detection to determine the frequency offset of the transmitted code.
Figure 18:
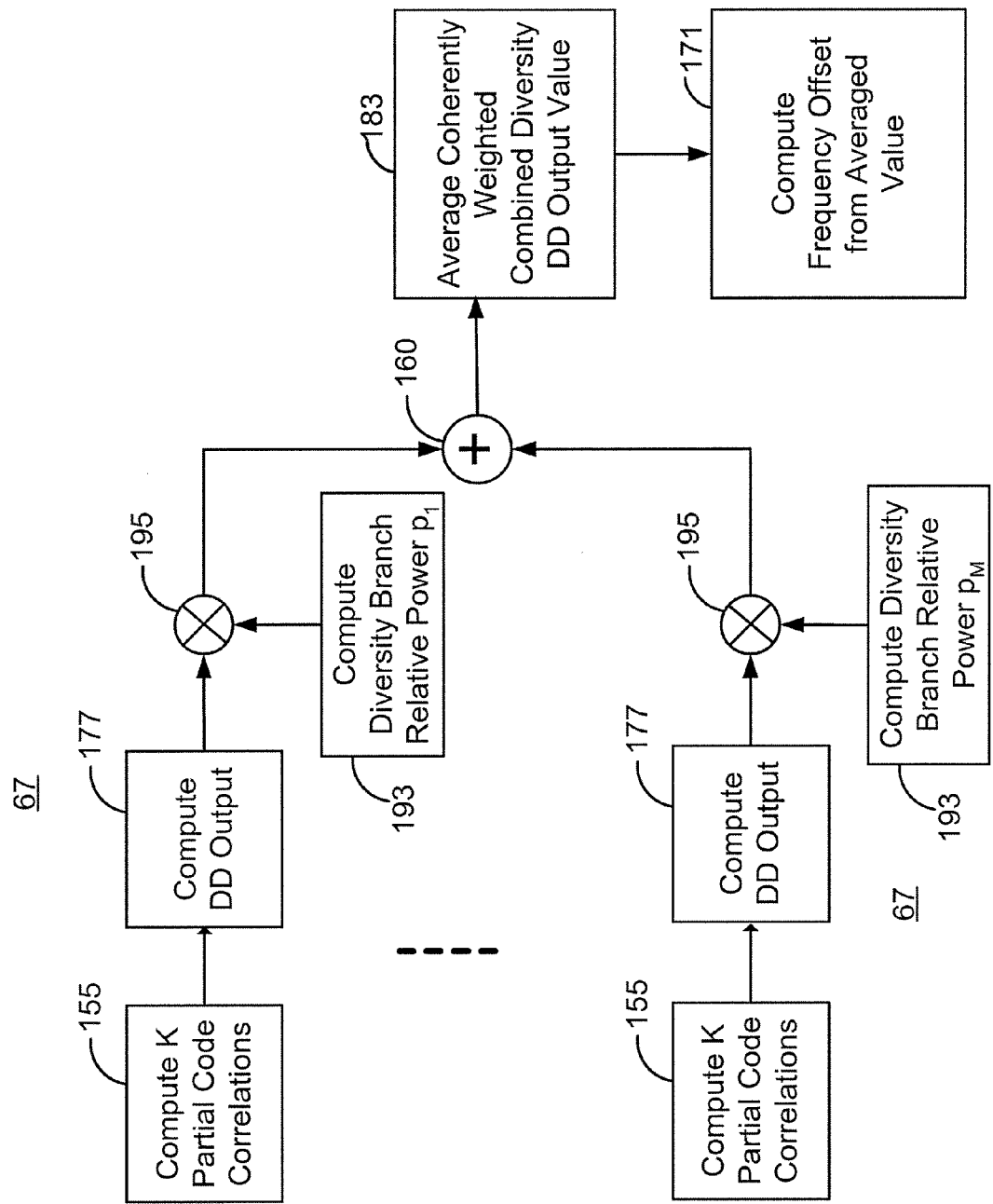
FIG. 18 illustrates one preferred method for acquiring frequency synchronization from a code transmitted from a wireless network using a diversity receiver which employs coherent weighted combining diversity and differential detection to determine the frequency offset of the transmitted code.

FIGS. 17 and 18 show a preferred logic for acquiring the frequency offset of the transmitted code using diversity mobile terminal employing a Differential Detection (DD) coherent combining diversity frequency synchronization receiver and a Differential Detection (DD) coherent weighted combining diversity frequency synchronization receiver.

In a preferred first step 155, $y_{m,k}$, is calculated over a variety of k values in each diversity branch m.

In a preferred second step 177, for each DD output (i.e., for each time index k), the mobile terminal combines 191 the DD output from the M diversity branches 67.

In the method employing a weighted coherent combining diversity receiver, a preferred first step comprises: 1) computing, for each of the M diversity branches, an estimate of the relative power of the diversity branch relative to the other branches 193, and 2) weighting each of the M diversity branches of the DD output by the relative power of each diversity branch relative to the others 195.

In a preferred third step 183, the combined DD output is input to the averaging block, and average over multiple DD outputs. In a preferred fourth step 171, the average DD value is used to compute the frequency estimate.

Methods describing a DD coherent combining diversity frequency synchronization receiver or a DD coherent weighted combining diversity frequency synchronization receiver using a PLL may be generally developed by one skilled in the art.

Advantages to the Preferred Methods of the Invention Relative to Current Methodologies

EXAMPLE 1

Example 1 compares the code synchronization time of a mobile terminal employing the diversity synchronization methods according to the invention and a mobile terminal employing a single antenna (prior art method) as a function of G for Wideband CDMA (WCDMA) channel test case II. UE Radio and Transmission and Reception (FDD), 3GPP TS 25.1010, v 3.4.1. G is defined as the ratio of the received signal intensity and the post-channel interference (i.e., AWGN and inter-cell interference). All the base station transmitter settings are according to the parameters given in UE Radio and Transmission and Reception (FDD), 3GPP TS 25.1010, v 3.4.1. In particular, this example compares the ability of a mobile terminal employing the diversity synchronization methods according to the invention and a mobile terminal employing a single antenna according to the prior art to detect the Gold code transmitted by a base station.

Figure 21:
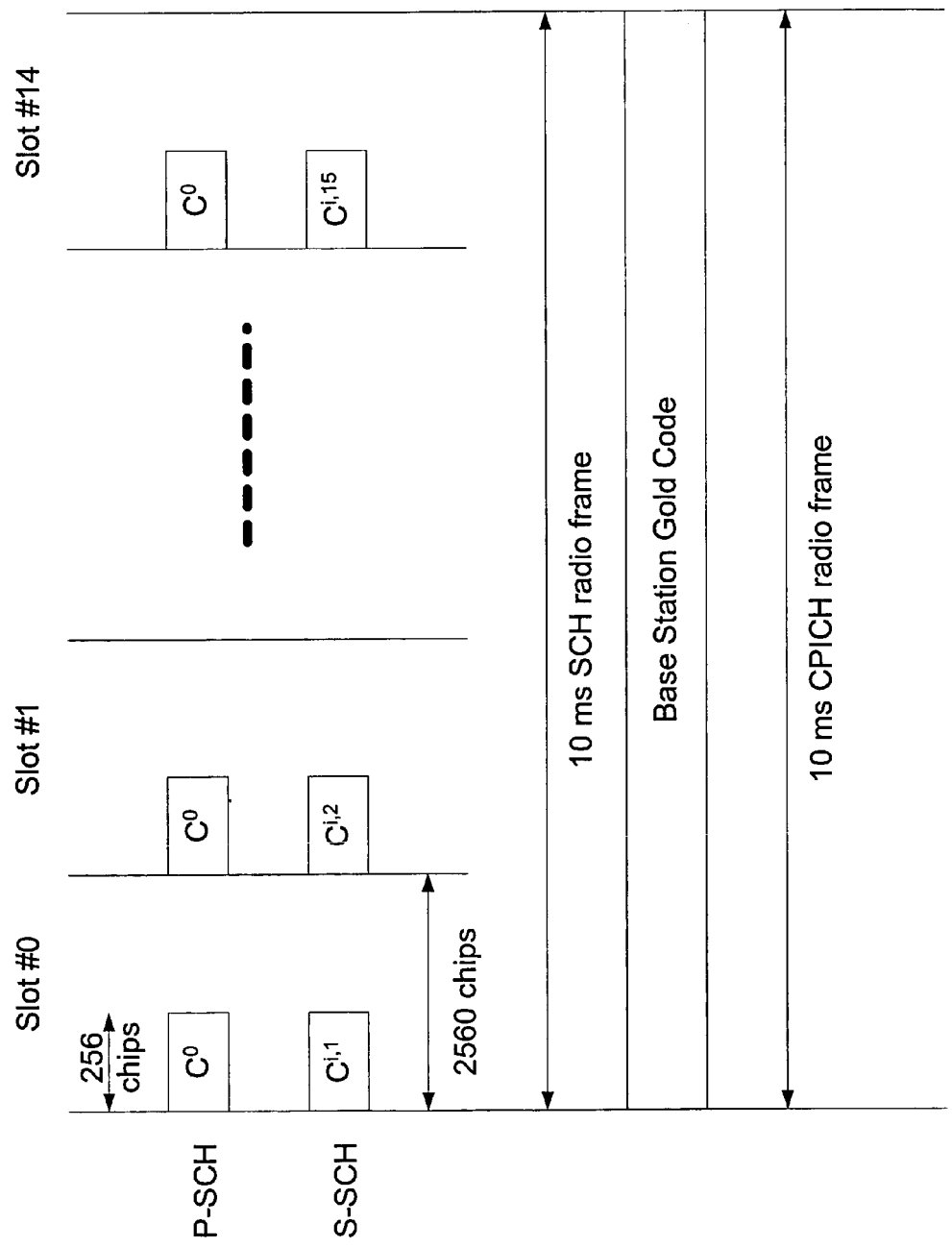
FIG. 21 illustrates the structure and relationship of the synchronization codes transmitted in a WCDMA network.

In a WCDMA system, the mobile terminal must find the base station frame boundary at the chip level, and the cell-specific Gold code. FIG. 21 illustrates the different codes transmitted from the base station used to achieve code synchronization. The cell search is started using the downlink Synchronization Channel (SCH). The SCH consists of two sub channels, the Primary and Secondary SCH (P-SCH and S-SCH). The P-SCH consists of a modulated code of length 256 chips, denoted $c^0$. The primary code $c_0$ is transmitted at the beginning of every slot (2560 chips) from all the base stations in the system. The S-SCH code $c_s^i$, i=1, . . .,64, consists of 15 modulated sequences $c_s^{i,k}$, i=1 , . . . ,64, and k=1, . . . ,15, of length 256 chips. The S-SCH secondary code $c_s^i$ starts at the beginning of the frame and is repeatedly transmitted every frame. There are 16 different S-SCH sequences $c_s^{i,k}$, i=1, . . . ,64 and k=1, . . . ,15. The 15 sequences form the secondary code $c_s^i$ taken from a codebook of 64 16-ary codewords. These 64 codewords correspond to 64 code groups used in the WCDMA system. Each code group consists of 8 Gold codes. The 64 codewords are also chosen such that they have distinct phase shifts. Therefore, the correct frame boundary and code group can be detected by finding the code $c_s^i$ transmitted from the base station and its beginning. Finally, a Common Pilot Channel (CPICH) is transmitted from the base station. The CPICH is scrambled using the cell-specific Gold code but no modulation is applied on the channel.

A four step synchronization procedure is used in this WCDMA example. In the first step, the mobile terminal uses a non-coherent combining diversity code synchronization receiver to detect the primary synchronization code $c^0$. The detection of the primary synchronization code $c_0$ indicates the slot boundary. In the second step, using the slot boundary detected in the first step, the mobile terminal detects the secondary synchronization code $c_s^i$ transmitted from the base station using a coherent combining code synchronization receiver. The detection of the secondary synchronization code $c_s^i$ indicates the code group used by the base station and the frame boundary. In the third step, using the frame boundary and code group information obtained in the second step, the mobile terminal uses a non-coherent combining diversity code synchronization receiver to detect the Gold code transmitted from the base station. In the fourth step, the mobile terminal synchronizes itself to the wireless network by using the detected Gold code and a FT non-coherent combining diversity frequency synchronization receiver.

In greater detail, in the first step, the diversity receiver uses a 256 symbol matched filter in each diversity branch and non-coherent combining is used to obtain the diversity output. The diversity output is stored for M consecutive outputs and averaged over N slot repetitions. Then, the receiver selects the maximum value and detects the primary code $c_0$, which determines the slot boundary.

In the second step, the receiver correlates in each diversity branch the input signal against each of the 64 codes $c_s^i$ and their 15 circular rotations. Then, the primary code detected in the first step is used as a reference to produce a coherent combining diversity output. The receiver selects the maximum diversity output value out of the 960 candidates, which indicates the secondary code number transmitted and the slot where the code starts (i.e., the frame boundary).

In the third step, the receiver correlates in each diversity branch the input samples with the 8 possible Gold codes for R samples. For each of the 8 possible Gold codes, a diversity output is produced using non-coherent combining. The diversity output with the largest value is selected and a "vote" is given to the corresponding code. This process is repeated K consecutive times. At the end, if the largest number of accumulated votes exceeds a pre-determined threshold, code synchronization is achieved; otherwise the entire process is repeated.

Figure 19:
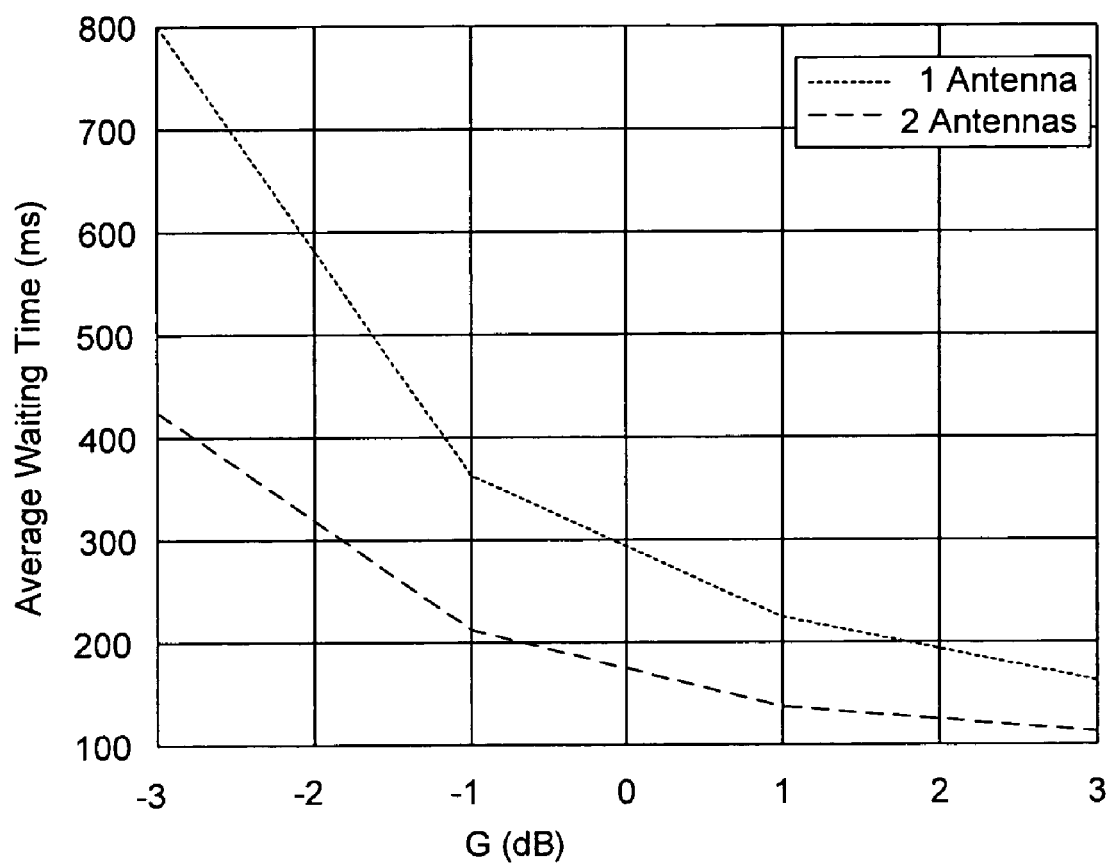
FIG. 19 compares the average code acquisition time of a mobile terminal employing the diversity synchronization methods according to the invention and a mobile terminal employing a single antenna as a function of the geometric factor for a Wideband CDMA channel test case.
Figure 20:
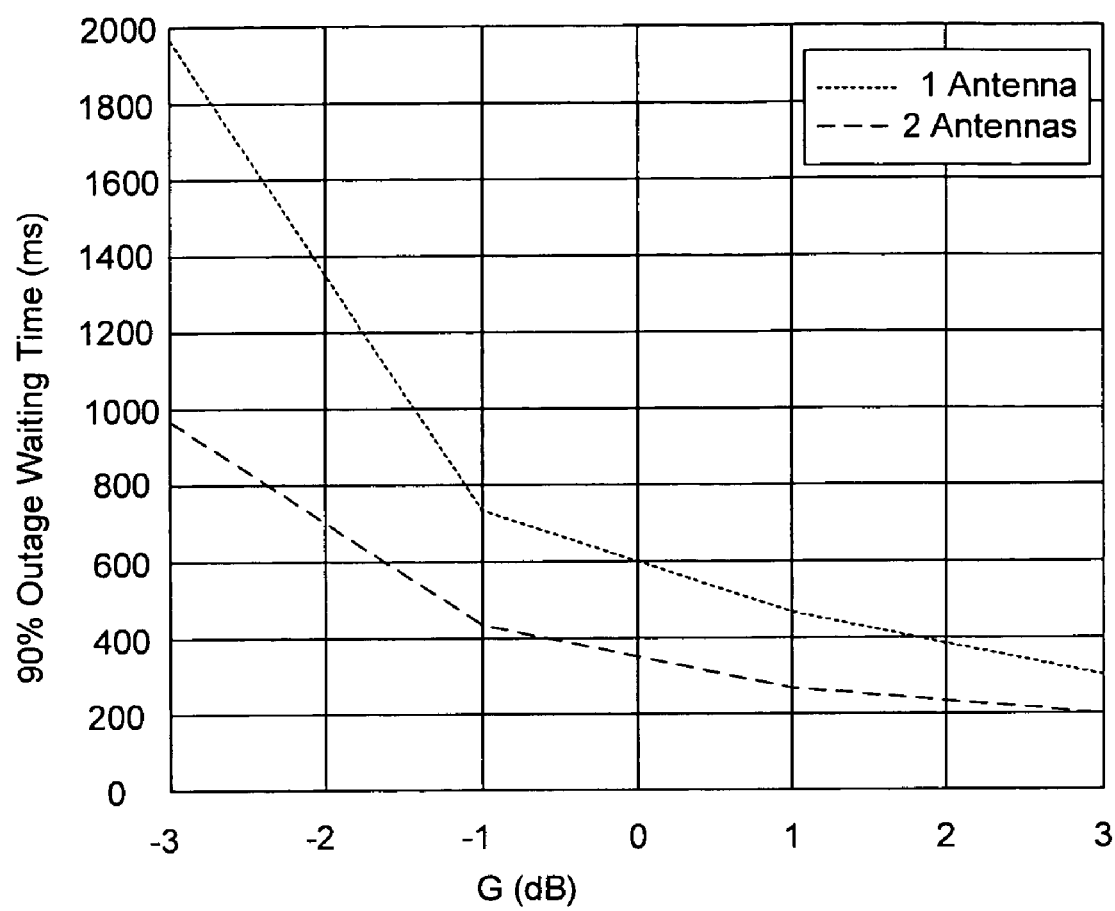
FIG. 20 compares the smallest time value which upper bound 90% of the code acquisition time of a mobile terminal employing the diversity synchronization methods according to the invention and a mobile terminal employing a single antenna as a function of the geometric factor for a Wideband CDMA channel test case.

FIGS. 19 and 20 show the results of Example 1 for code synchronization only (i.e., without the frequency synchronization). FIG. 19 shows the average acquisition time while FIG. 20 gives the 90% outage acquisition time (that is, 90% of the experiments yield an acquisition time smaller than the indicated value). For the case when the mobile terminal is between two base stations (i.e., G=O dB), the average and 90% outage waiting time for a mobile terminal to detect the gold code is decreased by 50% using the methods according to the invention relative to the current state-of-the-art methods.

Although the invention has been described with reference to preferred embodiments and specific examples, it will be readily appreciated by those skilled in the art that many modifications and adaptations of the invention are possible without deviating from the spirit and scope of the invention. Thus, it is to be clearly understood that this description is made only by way of example and not as a limitation on the scope of the invention as claimed below.

What is claimed is:

1. A method for synchronizing a mobile terminal to a wireless network, comprising the steps of:
    a. receiving a signal comprising a synchronization code broadcast by a base-station with a mobile terminal, wherein said mobile terminal receiving said signal comprises at least two diversity branches and at least two filters;
    b. processing said received signal by using at least two said diversity branches to determine at least one diversity output value prior to achieving code synchronization;
    c. processing at least one said diversity output value to determine said synchronization code;
    d. processing said received signal using at least two said diversity branches to synchronize a local oscillator of said mobile terminal based on said synchronization code.

2. The method of claim 1 wherein processing said received signal using at least two said diversity branches to determine at least one diversity output value further comprises the steps of:
    a. determining the absolute value of said filter output in each said diversity branch; and
    b. selecting which said output value has the largest absolute value, thereby determining said diversity output value.

3. The method of claim 1 wherein processing said received signals using at least two said diversity branches to determine at least one diversity output value further comprises the steps of:
    a. determining the absolute value of said filter output in each said diversity branch; and
    b. combining said output values thereby producing said diversity output value.

4. The method of claim 1 wherein processing said received signals using at least two said diversity branches to determine at least one diversity output value further comprises the steps of:
    a. determining the absolute value of said filter output in each said diversity branch;
    b. determining an estimate of the relative power of each said diversity branch relative to the power of the remaining diversity branches;
    c. weighting said absolute value of said filter output for each said diversity branch by said relative power of said diversity branch thereby forming a weighted filter output for each said diversity branch; and
    d. combining said weighted filter output values thereby producing a diversity output value.

5. The method of claim 1 wherein processing said received signals using at least two said diversity branches to determine at least one diversity output value further comprises the steps of:
    a. determining the relative instantaneous parallel channel estimate of each said diversity branch relative to the other diversity branches;
    b. determining the complex conjugate of each said relative instantaneous parallel channel estimate;
    c. weighting each said filter output of each said diversity channel by the complex conjugate of said relative instantaneous parallel channel estimate of said diversity branch thereby producing a co-phased and weighted filter output for each said diversity branch;
    d. combining each said co-phased and weighted filter output thereby producing a co-phased, weighted output magnitude; and
    e. determining the real part of said co-phased, weighted output magnitude, thereby producing a diversity output value.

6. The method of claim 1 wherein step (d) further comprising the steps of:
    a. generating a plurality of partial code correlations $y_{m,k}$, each said partial code correlation being characterized by a time index 'k', and a diversity branch index 'm';
    b. for each diversity branch, Fourier transforming said plurality of partial code correlations $y_{m,k}$ thereby forming a plurality of Fourier transform vectors;
    c. determining the absolute value of each element of each said Fourier transform vector;
    d. selecting for each said Fourier transform vector element, the corresponding Fourier transform vector element with largest absolute value from said plurality of Fourier transform vectors, thereby forming a selection diversity Fourier transform vector X(p);
    e. averaging said selection diversity Fourier transform vector over at least one Fourier transform block thereby forming an averaged selection diversity Fourier transform vector; and f. selecting the element of said averaged selection diversity Fourier transform vector with largest absolute value.

7. The method of claim 1 wherein step (d) further comprising the steps of:
   a. generating a plurality of partial code correlations $Y_{m,k}$, each said partial code correlation being characterized by a time index 'k', and a diversity branch index 'm';
   b. for each diversity branch, Fourier transforming said plurality of partial code correlations $y_{m,k}$ thereby forming a plurality of Fourier transform vectors
   c. determining the absolute value of each element of each said Fourier transform vector;
   d. summing the absolute value of each said corresponding Fourier transform vector element from each said Fourier transform vector, thereby forming a non-coherent combining diversity Fourier transform vector;
   e. averaging said non-coherent combining diversity Fourier transform vector over at least one Fourier transform block thereby forming an averaged non-coherent combining diversity Fourier transform vector; and
   f. selecting the element of said averaged non-coherent combining diversity Fourier transform vector with largest absolute value.

8. The method of claim 1 wherein step (d) further comprising the steps of:
   a. determining relative power of each said diversity branch relative to other said diversity branches;
   b. generating a plurality of partial code correlations $y_{m,k}$, each said partial code correlation being characterized by a time index 'k', and a diversity branch index 'm',
   c. for each diversity branch, Fourier transforming said plurality of partial code correlations $y_{m,k}$ thereby forming a plurality of Fourier transform vectors;
   d. determining the absolute value of each element of each said Fourier transform vector;
   e. weighting the absolute value of each said element of each said Fourier transform vector by the relative power of said diversity branch associated with said Fourier transform vector thereby forming weighted Fourier transform vector elements;
   f. summing each said corresponding weighted Fourier transform vector element from each said Fourier transform vector, thereby forming a weighted non-coherent combining diversity Fourier transform vector;
   g. averaging said weighted non-coherent combining diversity Fourier transform vector over at least one Fourier transform block thereby forming an averaged weighted non-coherent combining diversity Fourier transform vector; and
   h. selecting the element of said averaged weighted non-coherent combining diversity Fourier transform vector with the largest absolute value.

9. The method of claim 1 wherein step (d) further comprising the steps of:
   a. determining a plurality of partial code correlations $y_{m,k}$, each said partial code correlation $y_{m,k}$ being characterized by a time index 'k' and a diversity channel index 'm';
   b. determining the complex conjugate $y^*_{m,k}$ of partial code correlation $y_{m,k}$
   b. determining a differential detection output $X_m(k)$ according to $X_m(k)=y_{m,k} y^*_{m,k-1}$ for each said diversity branch;
   c. determining the absolute value of each said differential detection output $X(k)$; d. selecting the said differential detection output with the largest absolute value thereby forming a selection diversity differential detection output;
   e. determining a plurality of selection diversity detection outputs for a plurality of k index values;
   f. averaging said plurality of selection diversity differential detection outputs thereby forming an average selection diversity detection output; and
   g. determining the synchronization frequency from said averaged selection diversity differential detection output.

10. The method of claim 1 wherein step (d) further comprising the steps of:
    a. determining a plurality of partial code correlations $y_{m,k}$, each said partial code correlation $y_{m,k}$ being characterized by a time index k and a diversity channel index m;
    b. determining the complex conjugate $y^*_{m,k}$ of partial code correlation $y_{m,k}$
    c. determining a differential detection output $X_m(k)$ according to $X_m(k)=y_{m,k} y^*_{m,k-1}$ for each said diversity branch;
    d. combining said differential detection output values thereby producing said coherent diversity differential detection output value
    e. determining a plurality of coherent diversity detection outputs for a plurality of k index values;
    f. averaging said plurality of coherent diversity differential detection outputs thereby forming an average coherent diversity detection output; and
    g. determining the synchronization frequency from said averaged coherent diversity differential detection output.

11. The method of claim 1 wherein step (d) further comprising the steps of:
    a. determining a plurality of partial code correlations $y_{m,k}$, each said partial code correlation $Y_{m,k}$ being characterized by a time index k and a diversity channel index m;
    b. determining the complex conjugate $y^*_{m,k}$ of partial code correlation $y_{m,k}$
    c. determining the relative power, $P_m$, of each said diversity branch
    d. determining a differential detection output $X_m(k)$ according to $X_m(k)=y_{m,k} y^*_{m,k-1}$ for each said diversity branch;
    e. weighting said differential detection output by the relative power for each said diversity branch
    f. combining said weighted differential detection output values thereby producing said weighted coherent diversity differential detection output value
    g. determining a plurality of weighted coherent diversity detection outputs for a plurality of k index values;
    h. averaging said plurality of weighted coherent diversity differential detection outputs thereby forming an average weighted coherent diversity differential detection; and
    i. determining the synchronization frequency from said averaged weighted coherent diversity differential detection.

12. A method for synchronizing a mobile terminal to a wireless network comprising the steps of:
    a. receiving a signal comprising a synchronization code broadcast by a base-station with a mobile terminal, wherein said mobile terminal receiving said signal comprises at least two diversity branches and at least two filters;

b. processing said received signal using at least two said diversity branches to determine at least one diversity output value prior to achieving code synchronization;
c. comparing said diversity output value to a predetermined threshold;
d. determining said synchronization code; and
e. processing said received signal using at least two said diversity branches to synchronize the local oscillator of said mobile terminal based on said synchronization code.

13. The method of claim 12 wherein processing said received signals using at least two said diversity branches to determine at least one diversity output value further comprises the steps of:
   a. determining the absolute value of said filter output in each said diversity branch; and
   b. selecting which said output value has the largest absolute value, thereby determining said diversity output value.

14. The method of claim 12 wherein processing said received signals using at least two said diversity branches to determine at least one diversity output value further comprises the steps of:
   a. determining the absolute value of said filter output in each said diversity branch; and
   b. combining said output values thereby producing said diversity output value.

15. The method of claim 12 wherein processing said received signals using at least two said diversity branches to determine at least one diversity output value further comprises the steps of:
   a. determining the absolute value of said filter output in each said diversity branch;
   b. determining an estimate of the relative power of each said diversity branch relative to the power of the remaining diversity branches;
   c. weighting said absolute value of said filter output for each said diversity branch by said relative power of said diversity branch thereby forming a weighted filter output for each said diversity branch; and
   d. combining said weighted filter output values thereby producing a diversity output value.

16. The method of claim 12 wherein processing said received signals using at least two said diversity branches to determine at least one diversity output value further comprises the steps of:
   a. determining the relative instantaneous parallel channel estimate of each said diversity branch relative to the other diversity branches;
   b. determining the complex conjugate of each said relative instantaneous parallel channel estimate;
   c. weighting each said filter output of each said diversity channel by the complex conjugate of said relative instantaneous parallel channel estimate of said diversity branch thereby producing a co-phased and weighted filter output for each said diversity branch;
   d. combining each said co-phased and weighted filter output thereby producing a co-phased, weighted output magnitude; and
   e. determining the real part of said co-phased, weighted output magnitude, thereby producing a diversity output value.

17. The method of claim 12 wherein step (e) further comprising the steps of:
   a. generating a plurality of partial code correlations $y_{m,k}$, each said partial code correlation being characterized by a time index 'k', and a diversity branch index 'm';
   b. for each diversity branch, Fourier transforming said plurality of partial code correlations $Y_{m,k}$ thereby forming a plurality of Fourier transform vectors;
   c. determining the absolute value of each element of each said Fourier transform vector;
   d. selecting for each said Fourier transform vector element, the corresponding Fourier transform vector element with largest absolute value from said plurality of Fourier transform vectors, thereby forming a selection diversity Fourier transform vector $X(p)$;
   e. averaging said selection diversity Fourier transform vector over at least one Fourier transform block thereby forming an averaged selection diversity Fourier transform vector; and
   f. selecting the element of said averaged selection diversity Fourier transform vector with largest absolute value.

18. The method of claim 12 wherein step (e) further comprising the steps of:
   a. generating a plurality of partial code correlations $y_{m,k}$, each said partial code correlation being characterized by a time index 'k', and a diversity branch index 'm';
   b. for each diversity branch, Fourier transforming said plurality of partial code correlations $y_{m,k}$ thereby forming a plurality of Fourier transform vectors;
   c. determining the absolute value of each element of each said Fourier transform vector;
   d. summing the absolute value of each said corresponding Fourier transform vector element from each said Fourier transform vector, thereby forming a non-coherent combining diversity Fourier transform vector;
   e. averaging said non-coherent combining diversity Fourier transform vector over at least one Fourier transform block thereby forming an averaged non-coherent combining diversity Fourier transform vector; and
   f. selecting the element of said averaged non-coherent combining diversity Fourier transform vector with largest absolute value.

19. The method of claim 12 wherein step (e) further comprising the steps of:
   a. determining relative power of each said diversity branch relative to other said diversity branches;
   b. generating a plurality of partial code correlations $y_{m,k}$, each said partial code correlation being characterized by a time index 'k' and a diversity branch index 'm';
   c. for each diversity branch, Fourier transforming said plurality of partial code correlations $y_{m,k}$ thereby forming a plurality of Fourier transform vectors;
   d. determining the absolute value of each element of each said Fourier transform vector;
   e. weighting the absolute value of each said element of each said Fourier transform vector by the relative power of said diversity branch associated with said Fourier transform vector thereby forming weighted Fourier transform vector elements;
   f. summing each said corresponding weighted Fourier transform vector element from each said Fourier transform vector, thereby forming a weighted non-coherent combining diversity Fourier transform vector;
   g. averaging said weighted non-coherent combining diversity Fourier transform vector over at least one Fourier transform block thereby forming an averaged weighted non-coherent combining diversity Fourier transform vector; and
   h. selecting the element of said averaged weighted non-coherent combining diversity Fourier transform vector with the largest absolute value.

20. The method of claim 12 wherein step (e) further comprising the steps of:
   a. determining a plurality of partial code correlations $y_{m,k}$, each said partial code correlation $y_{m,k}$ being characterized by a time index 'k' and a diversity channel index 'm';
   b. determining the complex conjugate $y^*_{m,k}$ of partial code correlation $y_{m,k}$
   b. determining a differential detection output $X_m(k)$ according to $X_m(k) \ y_{m,k} \ y^*_{m,k-1}$ for each said diversity branch;
   c. determining the absolute value of each said differential detection output $X(k)$;
   d. selecting the said differential detection output with the largest absolute value thereby forming a selection diversity differential detection output;
   e. determining a plurality of selection diversity detection outputs for a plurality of k index values;
   f. averaging said plurality of selection diversity differential detection outputs thereby forming an average selection diversity detection output; and
   g. determining the synchronization frequency from said averaged selection diversity differential detection output.

21. The method of claim 12 wherein step (e) further comprising the steps of:
   a. determining a plurality of partial code correlations $y_{m,k}$, each said partial code correlation $y_{m,k}$ being characterized by a time index k and a diversity channel index m;
   b. determining the complex conjugate $y^*_{m,k}$ of partial code correlation $y_{m,k}$
   c. determining a differential detection output $X_m(k)$ according to $X_m(k)=y_{m,k} \ y^*_{m,k-1}$ for each said diversity branch;
   d. combining said differential detection output values thereby producing said coherent diversity differential detection output value
   e. determining a plurality of coherent diversity detection outputs for a plurality of k index values;
   f. averaging said plurality of coherent diversity differential detection outputs thereby forming an average coherent diversity detection output; and
   g. determining the synchronization frequency from said averaged coherent diversity differential detection output.

22. The method of claim 12 wherein step (e) farther comprising the steps of:
   a. determining a plurality of partial code correlations $y_{m,k}$, each said partial code correlation $y_{m,k}$ being characterized by a time index k and a diversity channel index m;
   b. determining the complex conjugate $y^*_{m,k}$ of partial code correlation $y_{m,k}$
   c. determining the relative power, $p_m$, of each said diversity branch
   d. determining a differential detection output $X_m(k)$ according to $X_m(k)=Y_{m,k} \ y^*_{m,k-1}$ for each said diversity branch;
   e. weighting said differential detection output by the relative power for each said diversity branch
   f. combining said weighted differential detection output values thereby producing said weighted coherent diversity differential detection output value
   g. determining a plurality of weighted coherent diversity detection outputs for a plurality of k index values;
   h. averaging said plurality of weighted coherent diversity differential detection outputs thereby forming an average weighted coherent diversity differential detection; and
   i. determining the synchronization frequency from said averaged weighted coherent diversity differential detection.

23. A method for synchronizing a mobile terminal to a wireless WCDMA network comprising the steps of:
   a. receiving a signal comprising a primary synchronization code, a secondary synchronization code and a Gold code, broadcast by a base-station with a mobile terminal, wherein said mobile terminal comprises at least two diversity branches and at least two filters;
   b. processing said received signal using at least two said diversity branches to determine the primary synchronization code;
   c. determining the slot boundary based upon the determination of said primary synchronization code;
   d. processing said received signal using at least two said diversity branches to determine the secondary synchronization code based upon said slot boundary;
   e. determining the code group based upon the determination of said secondary synchronization code;
   f. processing said received signal using at least two said diversity branches to determine the Gold code based upon said slot boundary and said code group; and
   g. synchronizing the local oscillator of said mobile terminal based upon said Gold code.

24. A method for synchronizing a mobile terminal to a wireless WCDMA network comprising the steps of:
   a. receiving a signal comprising a primary synchronization code, a secondary synchronization code and a Gold code, broadcast by a base-station with a mobile terminal, wherein said mobile terminal comprises
      1) at least one non-coherent combining diversity receiver with at least two diversity branches and wherein each diversity branch further comprises a 256 symbol primary synchronization code matched filter;
      2) at least one coherent combining diversity receiver with at least two diversity branches and wherein each diversity branch further comprises a primary and secondary synchronization code matched correlator;
      3) at least one non-coherent combining diversity receiver with at least two diversity branches and wherein each diversity branch further comprises a Gold code matched correlator; and
      4) at least one Fourier transform non-coherent combining diversity frequency synchronization receiver with at least two diversity branches;
   b. processing said received signal using said non-coherent combining diversity receiver to determine M consecutive non-coherent combining diversity output values;
   c. averaging said M consecutive non-coherent combining diversity output values over N slot repetitions;
   d. selecting the maximum value of step c to determine said primary synchronization code;
   e. determining the slot boundary from said primary synchronization code;
   f. correlating said received signal against each of the 64 secondary synchronization codes and the 15 circular rotations of each said secondary synchronization code using said coherent combining diversity receiver, wherein the channel estimate is provided by the primary synchronization code correlator output, thereby determining 960 coherent combining diversity output values;

g. determining the secondary synchronization code based upon the maximum value of said 960 coherent combining diversity output values;

i. correlating for R consecutive samples said received signal against each of the 8 possible Gold codes to determine 8 Gold code diversity outputs using said non-coherent combining diversity receiver;

j. generating a pluralities of said 8 Gold code diversity outputs;

j. determining said Gold code based upon said pluralities of Gold code non-coherent combining diversity output values; and k. synchronizing the local oscillator of said mobile terminal with said Fourier transform non-coherent combining diversity frequency synchronization receiver based upon said Gold code.

* * * * *